US012608116B2

(12) United States Patent
Gough et al.

(10) Patent No.: US 12,608,116 B2
(45) Date of Patent: Apr. 21, 2026

(54) THREE-DIMENSIONAL LAYERED CONFERENCING SYSTEM WITH DISTRIBUTED COMPUTING FOR HIGH-FIDELITY RENDERING OF VIRTUAL ENVIRONMENTS AND METHOD

(71) Applicant: Linkroom LLC, Addison, IL (US)

(72) Inventors: Brett Gough, South Barrington, IL (US); David Stephen Novak, Chicago, IL (US); Reynaldo Anthony Sánchez Herrera, Bagua (PE); Arturo Enrique Marruffo Vegas, Lima (PE)

(73) Assignee: Linkroom LLC, Addison, IL (US)

( * ) Notice: Subject to any disclaimer, the term of this patent is extended or adjusted under 35 U.S.C. 154(b) by 0 days.

(21) Appl. No.: 18/922,814

(22) Filed: Oct. 22, 2024

(65) Prior Publication Data
US 2025/0138698 A1 May 1, 2025

Related U.S. Application Data

(60) Provisional application No. 63/546,081, filed on Oct. 27, 2023.

(51) Int. Cl.
*H04L 12/18* (2006.01)
*G06F 3/04815* (2022.01)
*G06T 13/40* (2011.01)

(52) U.S. Cl.
CPC .......... *G06F 3/04815* (2013.01); *G06T 13/40* (2013.01); *H04L 12/1822* (2013.01)

(58) Field of Classification Search
CPC .. G06F 3/04815; H04L 12/1822; G06T 13/40
See application file for complete search history.

(56) References Cited

U.S. PATENT DOCUMENTS

| | | | | |
|---|---|---|---|---|
| 7,840,903 | B1 * | 11/2010 | Amidon | G06F 16/904 |
| | | | | 715/753 |
| 8,130,219 | B2 * | 3/2012 | Fleury | G06T 17/00 |
| | | | | 709/201 |
| 8,631,417 | B1 * | 1/2014 | Mendes Da Costa | |
| | | | | H04L 12/1827 |
| | | | | 709/227 |
| 9,007,427 | B2 * | 4/2015 | Hoover | H04N 7/157 |
| | | | | 348/14.1 |
| 9,098,167 | B1 * | 8/2015 | Issa | G06F 3/04815 |
| 9,813,672 | B2 * | 11/2017 | Avrahami | H04N 7/157 |
| 10,044,849 | B2 * | 8/2018 | Li | G06V 40/176 |
| 11,071,907 | B2 * | 7/2021 | Paquet | A63F 13/55 |

(Continued)

*Primary Examiner* — Jordany Nunez

(74) *Attorney, Agent, or Firm* — Nyman IP LLC; Scott Nyman

(57) ABSTRACT

A three-dimensional layered video platform for remotely rendering a high-fidelity experience is provided for virtualizing an environment to provide improved communication and conferencing between participants. The three-dimensional layered video platform for remotely rendering high-fidelity assets may include a local layer, high-fidelity layer, peer-to-peer communication layer, interface, and interoperability between layers. Additional layers may be added over time. A method for virtualizing an environment to provide improved communication and conferencing and/or video content delivery between participants using the three-dimensional layered video platform for remotely rendering a high-fidelity experience is also provided.

20 Claims, 10 Drawing Sheets

(56)     References Cited

U.S. PATENT DOCUMENTS

| | | | |
|---|---|---|---|
| 11,900,369 B2 * | 2/2024 | Sano | G06Q 20/10 |
| 2008/0309675 A1 * | 12/2008 | Fleury | G06T 17/00 |
| | | | 345/581 |
| 2009/0319919 A1 * | 12/2009 | Jung | G06F 16/954 |
| | | | 715/753 |
| 2011/0047267 A1 * | 2/2011 | Syvain | H04L 67/131 |
| | | | 709/224 |
| 2012/0182431 A1 * | 7/2012 | Asanov | A63F 13/335 |
| | | | 348/207.1 |
| 2014/0267221 A1 * | 9/2014 | Paquet | A63F 13/213 |
| | | | 345/419 |
| 2017/0048493 A1 * | 2/2017 | Avrahami | H04N 7/142 |
| 2018/0316939 A1 * | 11/2018 | Todd | H04N 21/21805 |
| 2019/0140885 A1 * | 5/2019 | Murrish | A63F 13/847 |
| 2020/0020172 A1 * | 1/2020 | Rogers | G06T 19/006 |
| 2021/0044779 A1 * | 2/2021 | Prins | H04L 12/1827 |
| 2022/0084017 A1 * | 3/2022 | Sano | G06Q 20/123 |
| 2023/0199147 A1 * | 6/2023 | Desserrey | H04L 51/046 |
| | | | 348/14.08 |
| 2024/0013495 A1 * | 1/2024 | Loclair | A63F 13/61 |
| 2024/0029340 A1 * | 1/2024 | Swanson | G06T 19/00 |
| 2024/0040085 A1 * | 2/2024 | Krol | H04N 7/157 |
| 2024/0112413 A1 * | 4/2024 | Wanbo | G06T 19/006 |
| 2024/0296643 A1 * | 9/2024 | Woodard, Jr. | G06T 19/20 |
| 2024/0386660 A1 * | 11/2024 | Jiang | G06T 17/00 |

* cited by examiner

THREE-DIMENSIONAL LAYERED CONFERENCING SYSTEM WITH DISTRIBUTED COMPUTING FOR HIGH-FIDELITY RENDERING OF VIRTUAL ENVIRONMENTS AND METHOD

CROSS-REFERENCE TO RELATED APPLICATION

This application claims the priority from U.S. provisional patent application Ser. No. 63/546,081 filed Oct. 27, 2023. The foregoing application is incorporated in its entirety herein by reference.

FIELD OF THE INVENTION

The present disclosure relates to a layered conferencing and/or video content delivery system with distributed computing to provide for remotely rendered high-fidelity environments and assets, locally rendered assets, and audiovisual communication. More particularly, the disclosure relates to a layered conferencing and/or video content delivery system to provide improved communication between participants present in a virtualized environment.

BACKGROUND

As video conferencing platforms have become an essential tool for communication between remotely-located participants, especially during global crises such as the COVID-19 pandemic, many activities or events that would have originally taken place in an in-person setting have been shifted online. Some of these activities or events include professional meetings, business discussions, product showings, networking events, general work meetings, house showings, and other events that may benefit from a sense of presence at a particular location. Additional activities could include meetings between friends, social events, clubs, family gatherings, baby showers, virtual game nights, and other events that could be conducted between personal friends or acquaintances, without limitation. Even as people may begin returning to in-person meetings, many virtual conferencing platforms remain in high demand due to their ability to connect people who live across town, in different states, or even in various countries. However, the need for more complex video conferencing platforms is only accelerating.

Currently, all known video conferencing platforms are only offered in a two-dimensional space and require participants to engage with each other through limited video and/or audio feeds displayed on a flat interface. More often than not, these types of conferencing platforms lead to a disconnection in communication as well as low engagement from the participants. Since the COVID-19 pandemic has expanded what it means to work-from-home, the need exists to redefine what a conferencing platform can provide to its participants to increase engagement and a sense of presence.

Historically, the move to virtualized environments has been limited by the ability of computers to render the scenery and environments in which participants communicate with one another. Rendering a believable and/or acceptable three-dimensional environment may require considerable computing requirements, which may be unobtainable by typical office computers, personal computers, mobile computing devices, or other devices. If such a requirement for high computation capabilities of each computer hosting a participant becomes too onerous, the required business and/or personal investment to use such a platform may be too high to encourage engagement. Conversely, platforms that may use rendering that can be performed on even the lowest power of computers may fail to provide a convincing or engaging environment, which mainly causes participants to prefer traditional video in antiquated video content delivery and/or conferencing platforms.

Therefore, a need exists to solve the deficiencies present in the prior art. What is needed is a platform where people can be naturally cooperative and social in an online environment. What is needed is a system where digital meeting solutions can act in a three-dimensional space. What is needed is a system that creates a believable, engaging, and immersive three-dimensional world for people to explore and exist in while communicating in a conferencing setting. What is needed is a system and method where an audiovisual conferencing and/or video content delivery platform can support a high-fidelity graphics environment while being visualized on virtually any device used by the general public. What is needed is a platform that can produce the high-fidelity graphics remotely and be presented to the general public, regardless of local hardware, with an agile video stream.

SUMMARY

An aspect of the disclosure advantageously provides a platform where people can be naturally cooperative and social in an online environment. An aspect of the disclosure advantageously provides a system where digital meeting solutions can act in a three-dimensional space. An aspect of the disclosure advantageously provides a system that creates a believable, engaging, and immersive three-dimensional world for people to explore and exist in while communicating in a conferencing setting. An aspect of the disclosure advantageously provides a system and method where an audiovisual conferencing and/or video content delivery platform can support a high-fidelity graphics environment while being visualized on virtually any device used by the general public. An aspect of the disclosure advantageously provides a platform that can produce the high-fidelity graphics remotely and be presented to the general public, regardless of local hardware, with an agile video stream.

As enabled by this disclosure, a system is provided including a non-transitory computer readable storage medium wherein at least one instruction is stored in the medium, and the at least one instruction is loaded and executed by a processor to provide a three-dimensional layered conferencing system with distributed computing for high-fidelity rendering of a virtual environment. The system may include a high-fidelity layer, local layer, communication layer, and interface and control layer. The high-fidelity layer may be rendered remotely on a server and streamed to a user device in approximately real-time over a network without intended delay comprising the virtual environment in high fidelity for a communication session. The local layer may be rendered locally on the user device comprising an avatar for a user to be integrated into the virtual environment for the communication session. The communication layer may be operated over a peer-to-peer network comprising audiovisual content of the user communicated in approximately real-time without intended delay for the communication session. The interface and control layer may provide interactive controls for managing at least interaction with the virtual environment and the audiovisual content during the communication session. At least part of the audiovisual content of the communication layer may be associated with the avatar of the local layer. At least the avatar and the audiovisual content may be spatially associated with a position within the virtual environment. A microphone and/or camera that is locally connected to the user device may be controlled via the interactive controls.

In another aspect, the virtual environment may be rendered by the server in three dimensions. The avatar and the audiovisual content may be positioned together and move about together in the three dimensions within the virtual environment.

In another aspect, navigational meshes may be used with the virtual environment to define an accessible area for the avatar that represents the user within the three dimensions.

In another aspect, the system may include a signaling server to initiate the communication session, negotiate parameters of the communication session, and relay control messages between the users of the communication session.

In another aspect, the signaling server may further monitor quality of the communication session, provide feedback regarding the communication session to the users, and manage session resources relating to the communication session.

In another aspect, predictive rendering may be used to improve responsiveness of the communication session by anticipating future actions of the user and pre-rendering frames of a viewable portion of the virtual environment.

In another aspect, anticipating the future actions may include the steps: (a) monitoring inputs by the user to predict likely next movements within the virtual environment; (b) predicting a future viewpoint of the user within the virtual environment; (c) pre-rendering the frames that correspond to the future viewpoints and storing the frames that are pre-rendered in a buffer; (d) if a current viewpoint significantly matches the future viewpoint, selecting the frames that were pre-rendered that best matches the current viewpoint and displaying the frames from the future viewpoint to the user as the current viewpoint; and (e) if the current viewpoint deviates significantly from the future viewpoint, falling back to on-demand rendering of the current viewpoint in approximately real-time without intended delay.

In another aspect, load balancing may manage the server rendering the virtual environment by distributing a rendering workload across multiple servers to reduce bottlenecks.

In another aspect, the interactive controls may be rendered by the user device.

In another aspect, the interactive controls may be rendered by the server and communicated to the user device via a second channel of the high-fidelity layer. The virtual environment may be additionally communicated to the user device via a first channel of the high-fidelity layer.

As enabled by this disclosure, a non-transitory computer readable storage medium is provided wherein at least one instruction is stored in the medium, and the at least one instruction is loaded and executed by a processor to provide a three-dimensional layered conferencing system with distributed computing for high-fidelity rendering of a virtual environment. The three-dimensional layered conferencing system may include a high-fidelity layer, local layer, communication layer, interface and control layer, and a signaling server. The high-fidelity layer may be rendered remotely on a server and streamed to a user device in approximately real-time over a network without intended delay comprising the virtual environment in three dimensions and in high fidelity for a communication session. The local layer may be rendered locally on the user device comprising an avatar for a user to be integrated into the virtual environment for the communication session. The communication layer may be operated over a peer-to-peer network comprising audiovisual content of the user communicated in approximately real-time without intended delay for the communication session. The interface and control layer may providing interactive controls for managing at least interaction with the virtual environment and the audiovisual content during the communication session. The signaling server may initiate the communication session, negotiate parameters of the communication session, and relay control messages between the users of the communication session. At least part of the audiovisual content of the communication layer may be associated with the avatar of the local layer. At least the avatar and the audiovisual content may be spatially associated with a position in the three dimensions within the virtual environment. The signaling server may further monitor quality of the communication session, provide feedback regarding the communication session to the users, and manage session resources relating to the communication session.

In another aspect, a microphone and/or camera that is locally connected to the user device may be controlled via the interactive controls.

In another aspect, navigational meshes may be used with the virtual environment to define an accessible area for the avatar that represents the user within the three dimensions.

In another aspect, predictive rendering may be used to improve responsiveness of the communication session by anticipating future actions of the user and pre-rendering frames of a viewable portion of the virtual environment. Anticipating the future actions may include the steps: (a) monitoring inputs by the user to predict likely next movements within the virtual environment; (b) predicting a future viewpoint of the user within the virtual environment; (c) pre-rendering the frames that correspond to the future viewpoints and storing the frames that are pre-rendered in a buffer; (d) if a current viewpoint significantly matches the future viewpoint, selecting the frames that were pre-rendered that best matches the current viewpoint and displaying the frames from the future viewpoint to the user as the current viewpoint; and (e) if the current viewpoint deviates significantly from the future viewpoint, falling back to on-demand rendering of the current viewpoint in approximately real-time without intended delay.

As enabled by this disclosure, a method is provided for managing a three-dimensional layered conferencing system with distributed computing for high-fidelity rendering of a virtual environment, the method being performed on a computerized device comprising a processor and memory with instructions being stored in the memory and operated from the memory to transform data. The method may include a) initiating a communication session via a signaling server. The method includes b) rendering remotely on a server a high-fidelity layer comprising the virtual environment in three dimensions. The method may include c) streaming the high-fidelity layer to a user device in approximately real-time over a network without intended delay for the communication session. The method may include d) rendered locally on the user device a local layer comprising an avatar for a user to be integrated into the virtual environment for the communication session. The method may include e) coordinating over a peer-to-peer network a communication layer comprising audiovisual content of the user communicated in approximately real-time without intended delay for the communication session. The method may include f) providing interactive controls via an interface and control layer for managing at least interaction with the virtual environment and the audiovisual content during the communication session. At least part of the audiovisual content of the communication layer may be associated with the avatar of the local layer. At least the avatar and the audiovisual content may be spatially associated with a position within the virtual environment in the three dimensions. The signaling server may additionally negotiate parameters of the communication session and relay control messages between the users of the communication session.

In another aspect of the method, the signaling server may further monitor quality of the communication session, provide feedback regarding the communication session to the users, and manage session resources relating to the communication session.

In another aspect of the method, predictive rendering may be used to improve responsiveness of the communication session by anticipating future actions of the user and pre-rendering frames of a viewable portion of the virtual environment.

In another aspect of the method, anticipating the future actions may include the steps: (i) monitoring inputs by the user to predict likely next movements within the virtual environment; (ii) predicting a future viewpoint of the user within the virtual environment; (iii) pre-rendering the frames that correspond to the future viewpoints and storing the frames that are pre-rendered in a buffer; (iv) if a current viewpoint significantly matches the future viewpoint, selecting the frames that were pre-rendered that best matches the current viewpoint and displaying the frames from the future viewpoint to the user as the current viewpoint; and (v) if the current viewpoint deviates significantly from the future viewpoint, falling back to on-demand rendering of the current viewpoint in approximately real-time without intended delay.

In another aspect of the method, load balancing may manage the server rendering the virtual environment by distributing a rendering workload across multiple servers to reduce bottlenecks.

In another aspect of the method, the interactive controls may be rendered by the server and communicated to the user device via a second channel of the high-fidelity layer. The virtual environment may be additionally communicated to the user device via a first channel of the high-fidelity layer.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
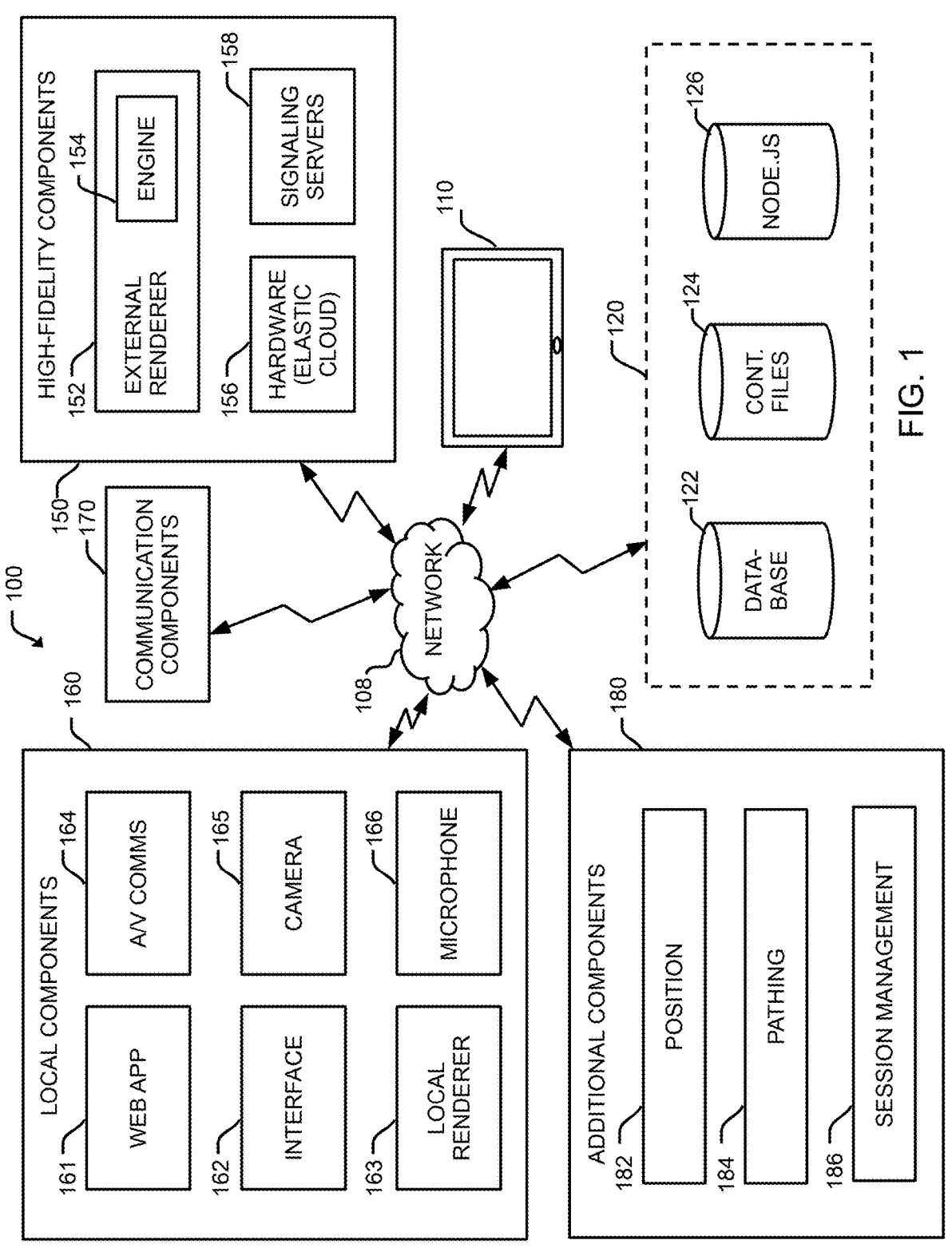
FIG. 1 is a block diagram view of an illustrative conferencing system, according to an embodiment of this disclosure.
Figure 2:
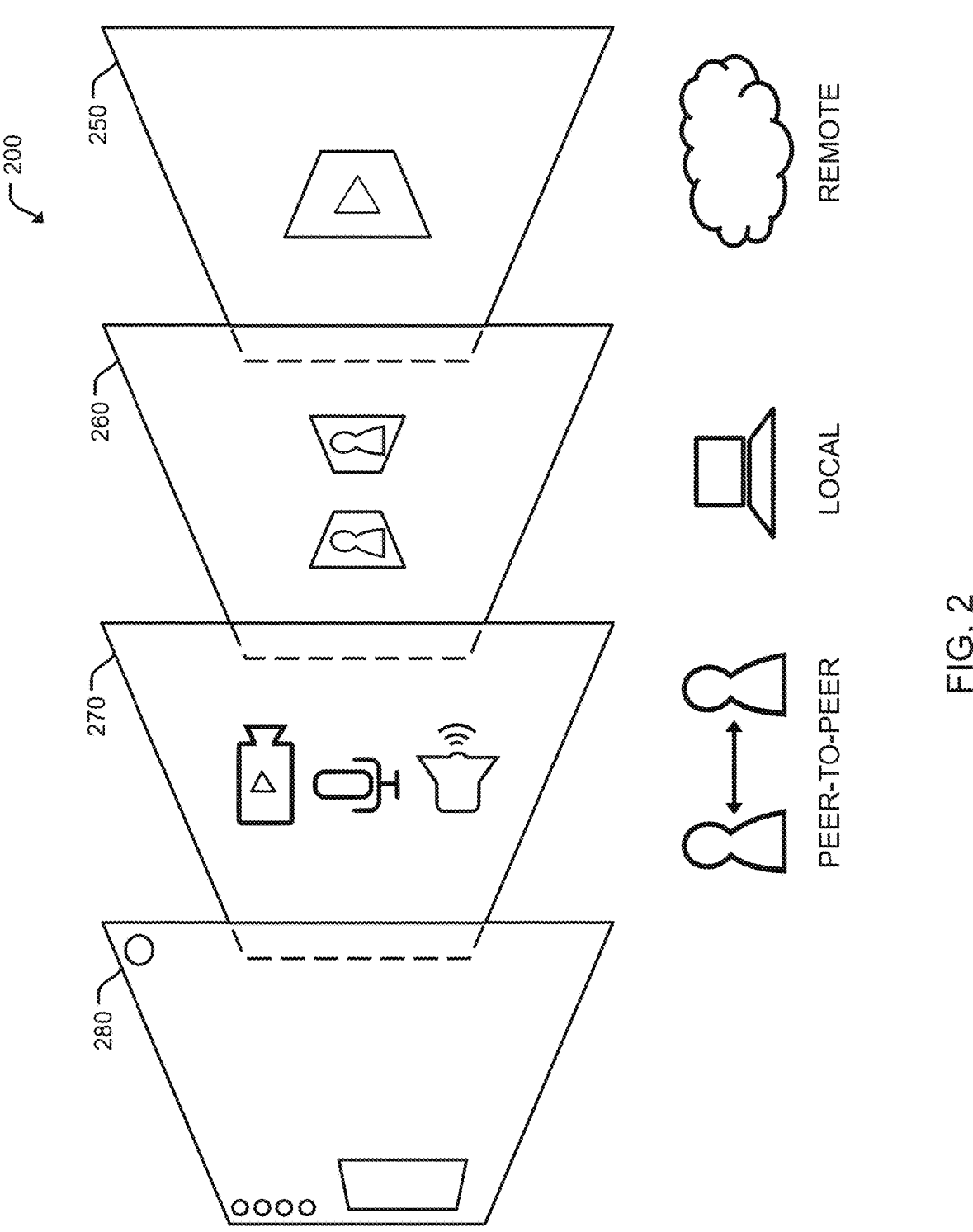
FIG. 2 is a diagram view of various layers of an illustrative conferencing system, according to an embodiment of this disclosure.

The following disclosure is provided to describe various embodiments of a three-dimensional layered conferencing system with distributed computing to provide for remotely rendered high-fidelity environments and assets, locally rendered assets, and audiovisual communication. Skilled artisans will appreciate additional embodiments and uses of the present invention that extend beyond the examples of this disclosure, for example, campus tours, museum tours, athletic facility tours, building tours, guided tours, demonstrations with a sense of virtual presence, virtual tourism, and other uses that would be apparent after having the benefit of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The term Linkpad, as it is used throughout this disclosure, is defined as a representation of a participant and/or other user, which may be provided by an avatar or other virtual representation of the participant, and which may serve as a point of origin for broadcasting at least part of the audio and/or video content. The term high-fidelity, as it is used throughout this disclosure, is defined as reproduction of sound and/or visual quality, capturing, and reproducing details with high precision and clarity. The term high-fidelity experience, as it is used throughout this disclosure, is intended to describe the experience perceived by the user including assets, physics, sound fidelity, interaction between assets, lighting, environment transformation, and other characteristics that improve the sense of presence in a simulated environment. The term ray tracing, as it is used throughout this disclosure, is defined as a rendering technique that simulates the behavior of light by tracing and/or simulating the path of individual rays, allowing for highly realistic and lifelike rendering of shadows, reflections, physics, sound, and other effects in computer graphics.

The term real-time or approximately real time, as it is used throughout this disclosure, in defined as operating about instantaneously not withstanding potential unintended delays that may be unavoidable due to network latency, timings, buffering, or other operations that may introduce minimal time lapses between when an output is rendered and when its viewed by a user, as would be appreciated by those of skill in the art. The term position data, as it is used throughout this disclosure, is defined as the data which identifies the location of an asset within the virtual environment, headings, direction, and coordinates (for example X, Y, and Z corresponding with a location within a three-dimensional environment).

The term render stream, as it is used throughout this disclosure, is defined as a substantially continuous flow of rendered frames or images, typically used in real-time applications such as video games or live streaming, to provide a smooth and uninterrupted visual experience to the viewer. The term channel, as it is used throughout this disclosure, is defined as a model for interprocess communication and synchronization among various distributed computing platforms. The term latency, as it is used throughout this disclosure, is defined as a measure of time it takes for data to travel between its source and destination in a network or system, often representing the delay or lag experienced during communication or data processing. The term peer-to-peer, as it is used throughout this disclosure, is defined as a decentralized communication or exchange model in which participants interact directly with one another, without the need for intermediaries, facilitating low-latency sharing, collaboration, or transactions between peers.

Various aspects of the present disclosure will now be described in detail, without limitation. In the following disclosure, a three-dimensional layered video platform for remotely rendering a high-fidelity experience will be discussed. Those of skill in the art will appreciate alternative labeling of the three-dimensional layered conferencing system with distributed computing for high-fidelity rendering of virtual environments as a layered conferencing system with distributed computing for high-fidelity rendering of virtual environments; a layered three-dimensional platform for combining high-fidelity assets with a local layer system, virtualized meeting space with high-fidelity visuals, video conferencing platform featuring virtualized environments, the invention, or other similar names. Similarly, those of skill in the art will appreciate alternative labeling of the method of providing a layered conferencing system with distributed computing for high-fidelity rendering of virtual environments as a method for providing a layered conferencing system with distributed computing for high-fidelity rendering of virtual environments, method of providing high-fidelity environments for virtualized conferencing, virtualization method for conferencing in a simulated space, method for provided virtualized environments on platforms with varying compute capabilities, method, operation, the invention, or other similar names. Skilled readers should not view the inclusion of any alternative labels as limiting in any way.

Referring now to FIGS. 1-10, the three-dimensional layered video platform for remotely rendering high-fidelity experiences will now be discussed in more detail. The three-dimensional layered video platform for remotely rendering high-fidelity assets may include a local layer, high-fidelity layer, peer-to-peer layer, interface and control layer, interoperability between layers, and additional components that will be discussed in greater detail below. The three-dimensional layered video platform for remotely rendering high-fidelity assets may operate one or more of these components interactively with other components for virtualizing an environment to provide improved communication and conferencing between participants.

The system will now be discussed generally, with reference to the figures shown in the accompanying drawings. The system may include multiple computing blocks spread across various locations, computational systems, servers, databases, and other electronic systems, each of which may be distributed and/or in communication with one another over a network. For example, as shown in block diagram 100 of FIG. 1, the system enabled by this disclosure may include local components 160, high-fidelity components 150, communication components 170, additional components 180, and/or various databases 120 connected via and network 108.

In one example, the local components 160 may include a web application 161, an interface 162, a local renderer 163, audiovisual communications 164, a camera 165, a microphone 166, and/or other components. In an additional example, the high-fidelity components 150 may include an external renderer 152, which may further include an engine 154, for example a graphics engine to render a three-dimensional environment, remote hardware 156 such as an elastic cloud or server instance and signaling servers 158. In one example, the additional components 180 may include positioning components 182, pathing components 184, and session management components 186.

Databases 120 may include a first database 122 to include general storage, for example as may be provided through an Aurora instance; a second database 124 to hold files, contents, models, assets, and art that may be provided for example via an S3 instance; and a third database 126 to include backend data, such as Node.js, that may be provided for example via a Lambda instance. Those of skill in the art will appreciate various other database structures that may hold the information that may be used by a system enabled by this disclosure after having the benefit of this disclosure and without limitation.

In at least one embodiment, the high-fidelity components 150 may remotely render and transmit a high-fidelity virtual environment over a network 108 to the other components of a system enabled by this disclosure. In one example, the remotely-rendered virtual environment may be transmitted via a network 108 using technologies such as rendered frame streaming, which may advantageously allow the transmission of substantially real-time, high-quality rendering to users, regardless of the local hardware they possess. Rendered frame streaming is the process by which visual data in the form of pixels is generated on a remote server, such as operated by the high-fidelity components 150, then sent in substantially real-time to an end-user device 110 for display. Those of skill in the art will appreciate additional names for rendered frame streaming that describe related technologies, for example, pixel streaming as viewed in the context of the Unreal Engine. Rendered frame streaming may be advantageous over traditional video content delivery, as rendered frame streaming may capture the rendered frames directly and send them to the user device 110, enabling the user to experience high-quality graphics and engage in a high-fidelity experience without relying on powerful local hardware.

As will be appreciated by those of skill in the art, rendered frame streaming involves a server-side application that may run and render an interactive environment. As the user interacts with this environment, the server may process these interactions, update the graphical output accordingly, and send the newly rendered frames back to the user device 110 as a video stream. Simultaneously, the user's interactions, such as mouse movements, clicks, keyboard interaction, touch inputs, and/or other interactions may be transmitted back to the server to influence the next set of frames generated by the high-fidelity components 150. In this illustrative configuration, rendered frame streaming may advantageously offload the graphical and computational demands to a powerful server, permitting users with low-end devices or those without the required rendering software to access and interact with high-fidelity graphical environments delivered as a high-fidelity layer 250, 350, 550. By providing users with a high-fidelity layer 250, 350, 550 of increased rendering fidelity for three-dimensional environments, traditional boundaries between local and remote computing can be seamlessly blurred, permitting users to access rich and interactive virtual environments from virtually any device.

As will be appreciated by those of skill in the art, rendered frame streaming solutions typically require a persistent network 108 connection to deliver the remotely-rendered high-fidelity environment to a local user device 110. However, network connections may be prone to temporary interruptions that may at least temporarily inhibit the ability of a remotely-rendered high-fidelity environment from being delivered to the local user device 110 in optimal quality. To solve this issue inherent to network-connected platforms, fallback mechanisms are provided for maintaining and/or simulating a substantially seamless user experience, especially in systems relying on real-time data transfer, such as rendered frame streaming.

In one example of a fallback mechanism, a system enabled by this disclosure may timely detect a nonoptimal network condition. The system of this example may continuously monitor the quality and stability of the connection, such as through regular "heartbeat" checks, measuring the latency of data transfers, or tracking lost data packets, as will be appreciated by those of skill in the art. If a system enabled by this disclosure detects a threshold of instability or packet loss, it may begin the process of transitioning to local rendering. Local rendering may include processing requirement mitigation techniques such as use of a local cache, reduced render fidelity, hybrid rendering solutions, bilateral adjustments to the bitrate of a pixel-streaming feed, and seamless reintegration of the pixel-streamed high-fidelity environment upon restoration of the network link.

In one example of mitigation, the local system may include a cache of local assets and other data. For example, to ensure a smooth transition from rendered frame streaming to local rendering, the system may include a cache mechanism to store the most recent and relevant assets and data from the streamed environment. The size and contents of this cache may depend on the application and user behavior, but its main purpose is to provide the necessary resources for local rendering without a noticeable lag or loading time for the user.

If access to the remotely-rendered high-fidelity environment is unavailable, the system of this example may transition to local rendering. For example, once the system of this example detects an unstable connection and has the necessary assets cached, it may substantially immediately start rendering the environment locally. The user might notice a slight shift in graphical quality, depending on the capability of their local hardware compared to the high-fidelity renderer or other server hardware. However, the interactive environment should remain functional and responsive, albeit at reduced fidelity.

In some situations, a full transition from remote to local rendering might not be feasible due to hardware limitations. In such cases, a hybrid rendering mode may be used to prioritize rendering critical components locally while still attempting to retrieve less crucial visual components from the server. This approach ensures that the user can still interact with the environment even if not all visual elements are at their highest quality. Some options for a hybrid approach such as this may include flat shading of textures, reduction of polygon count, reduction of models and assets presented, simplified lighting, and or other changes to the rendering requirements that would permit a local device to process at least part of an environment using local hardware.

In some examples, a user may be notified upon the transition from a remotely rendered high-fidelity pixel-stream to an at least partial reduction of quality, such as may be inherent to local rendering. For example, when transitioning to local rendering, the system may notify the user about the change, explaining the reason briefly by display of an icon and/or text such as, without limitation, "Switched to local rendering due to connection issues". Additionally, once the connection stabilizes, the system could provide an option for users to switch back to rendered frame streaming and/or restore the pixel-stream automatically, depending on the application's design.

Once the connection to the rendered frame streaming server is restored and/or stabilized, the system may synchronize any local changes made by the user during the period of local rendering to the server, re-establish rendered frame streaming, and gradually phase out local rendering. The transition back should be as smooth as the initial fallback to ensure the user's experience is uninterrupted.

Resources used by local, remote, peer-to-peer, and other aspects of a system enabled by this disclosure may be stored by and/or retrieved from one or more databases. For example, assets, contents, code, and/or other data may be stored on one or more databases connected via a network. In one example, provided without limitation, a cloud hosting platform and included products may be used to store and deliver data, such as cloud products provided by Amazon Web Services, Inc. of Seattle, WA. For example, diverse storage structures may be used to ensure optimal performance, scalability, and flexibility for a platform featuring a real-time, interactive environment by leveraging a robust storage solution to manage user data, assets, and computational operations via Amazon Aurora, S3, and Lambda.

In this example, Aurora may serve as the backbone for structured data storage. As a fully managed relational database, Aurora offers performance comparable to commercial databases with the cost-effectiveness of open-source systems. User profiles, session logs, game states, and other structured data can be stored in tables with relations ensuring data integrity and facilitating complex queries. Aurora may provide replication features advantageous to a system enabled by this disclosure. For example, data availability and speed across various regions may benefit from Aurora's replication features, which include both read replicas and cross-region replication allowing users to access data swiftly, regardless of their geographical location. Replication may additionally minimize latency and enhance the user experience.

In this example, Simple Storage Service (S3), a scalable object storage service, may be used for storage and management of files, contents, models, assets, art, user data, and other data. In the context of the present example, S3 may store textures, 3D models, art assets, sound files, objects, and/or other content that can be stored within S3 buckets. Content may also be delivered from S3. For example, when users engage with the system of this example, assets stored in S3 may need to be delivered to the user devices. S3 may integrate with the rendering pipelines, content delivery networks, and other operations to ensure that assets like textures or virtual environments are delivered to users swiftly, leveraging a global network of edge locations to reduce latency.

S3 may additionally include data related to a user, which will be appreciated by skilled artisans as user data. This user data may identify a person as unique, grant the user permissions, privileges, and access within the platform discussed enabled by this disclosure, record and present preferences in terms of how a user prefers audio and/or video delivery and transmission, and other applications of user data and preferences that would be apparent after having the benefit of this disclosure. Information included by S3, including assets and user data, can advantageously be used by the local and high-fidelity rendering pipelines to create the experience tailored for each user.

As the platform evolves, environments are added, and use cases expand, assets may be updated. In some embodiments, S3 may provide versioning features to ensure multiple versions of an asset are preserved. Preservation of asset versions advantageously facilitates rolling assets back to previous versions, comparison, or for archival purposes. Additionally, S3 offers cross-region replication, ensuring assets are backed up in geographically separate locations, adding an extra layer of data protection.

Storage solutions may additionally provide a backend, for example, a serverless backend such as Lambda compute service. In an example system, Lambda can be employed to run a backend, for example and without limitation, as provided by Node.js. Whether processing user requests, managing movement and environmental interaction logic, or handling other server-side operations, Lambda may allow the platform to execute these functions without provisioning or managing servers.

In some embodiments, Lambda may provide event-driven functions. In the context of the system of this example, specific actions or triggers, such as a user joining a session or initiating an event associated with the high-fidelity environment, can substantially automatically invoke corresponding Lambda functions. Event-driven model applications may ensure that resources are only consumed when necessary, advantageously leading to cost savings and efficiency.

In some embodiments, various data storage structures may be integrated with one another. For example, multiple AWS services such as Aurora, S3, and Lambda may be seamlessly integrated with one another. In an illustrative integration, Lambda may be triggered based on events in both Aurora and S3. For example, if a new asset is added to an S3 bucket, a Lambda function might be invoked to update a database record in Aurora. Conversely, changes in Aurora data can lead to operations on S3 assets, which may be controlled via Lambda.

Security and compliance requirements may be defined and applied to storage structures associated with a system enabled by this disclosure. For example, storage structures may use data encryption, both in transit and at rest, access control mechanisms, and integration with identity and access management (IAM) features to ensure that platform data and operations remain secure. Additionally, the storage structures may be monitored with regard to the health, performance, and activities of such structures to preemptively identify issues, analyze usage patterns, and optimize both storage and computation operations for the platform.

The high-fidelity layer 250, 350, 550 will now be discussed generally, with reference to the figures shown in the accompanying drawings. The high-fidelity layer 250, 350, 550 may include a virtualized environment rendered by a remote server, renderer, or other device with high computing capabilities that facilitate creating realistic and/or high-quality environments for participants to virtually exist within while engaging with one another during a conferencing event or other use of a system enabled by this disclosure. A high-fidelity rendering of the environment may be created remotely and streamed to a user's local device, while receiving inputs entered at the local device to control position and other data on the remotely-rendered environment of the high-fidelity layer 250, 350, 550, as will be discussed in greater detail below. The rendered environment existing on the high-fidelity layer 250, 350, 550 may be transmitted to the local device using rendered frame streaming, video delivery, and/or other techniques that would be appreciated by a person having skill in the art after having the benefit of this disclosure.

In one example, one or more remote rendering engines may produce high-fidelity virtual environments to advantageously enhance a user's digital experiences as they engage and communicate with other participants. By providing environments rendered remotely by highly capable computerized devices on a high-fidelity layer 250, 350, 550, even local machines with minimal graphical capabilities are able to engage with sophisticated and intricate virtual landscapes, environments, locations, and other rendered scenes. Remote rendering provides an ability to offload the resource-intensive process of graphical rendering to powerful servers and renderers, rather than executing it locally on a client device. Once rendered, the resulting output may be streamed to the local device as video frames. In some embodiments, an output may be streamed to multiple recipient devices substantially simultaneously. This configuration advantageously enables even low-power devices, such as mobile phones, laptops, tablets, smart televisions, smart watches, lightweight AR glasses, and other devices to display high-quality virtual environments without being burdened by the computational heaviness of rendering. Offloading the significant compute requirements of rendering a high-fidelity environment to remote servers and renderers also advantageously reduces power demand, lowers operating temperature, and improves battery life of the local client device by not being required to operate its local processors at or near their capacities.

The high-fidelity layer 250, 350, 550 may allow users to experience a great level of graphical detail and realism in the virtual environment on essentially any device. The high-fidelity layer 250, 350, 550 may encapsulate the intricate textures, realistic lighting, accurate shadows, complex models, large environments, extended view distances, and other features to improve the sense of presence while engaging with a system such as one enabled by this disclosure. Remote rendering engines in the high-fidelity layer 250, 350, 550 may benefit from modern graphics processing units (GPUs), which may be configured to handle the desired compute load to render an output. These GPUs rendering the high-fidelity layer 250, 350, 550 may be specially designed for parallel processing, making them adept at handling the thousands of concurrent operations required to render detailed virtual scenes with a high degree of realism.

Even with high-power processing capability made available by the remote server or rendering, it may be advantageous to selectively render only the assets and environments that are essentially perceptible by the user. In expansive virtual environments, not every object needs the highest level of detail at all times. Remote rendering engines often use dynamic level of detail (LoD) techniques, wherein objects closer to the viewer or central to the interaction may be rendered in high detail, while those in the background or periphery might be rendered with lower detail. The use of LoD scaling advantageously conserves computational resources by eliminating or reducing the power required to render assets and environmental detail that will not be perceptible to the user.

For remote rendering of a high-fidelity layer 250, 350, 550 to be effective, especially in interactive virtual environments, the latency associated with delivering rendered frames to the local client device may be minimized. The server may be configured such that the time taken to render the environment, transmit the frames to the local device, and display them should be imperceptible to the user. In one example, advanced remote rendering engines may employ techniques like predictive rendering, where potential future frames are rendered in advance based on user interactions, to reduce perceived latency. In another example, over rendering may be utilized to create a larger number of rendered frames at the high-fidelity layer 250, 350, 550 than may be streamed to a client device, which may advantageously provide additional data to mitigate losses due to network transmission errors, provide a data buffer, or otherwise enhance opportunities to synchronize data streams over a network.

Perceived latency may additionally be affected by streaming bandwidth capacity. Streaming high-quality, real-time graphics requires substantial bandwidth as the bit-rate of the streamed feed increases. Additionally, users might move, explore, and interact with the virtual environment in unpredictable ways. The remote rendering engine may be designed to anticipate these actions to a degree, ensuring that the high-fidelity layer 250, 350, 550 consistently responds fluidly to user inputs. To address this, remote rendering engines may employ advanced compression algorithms to ensure that the visual data is condensed for transmission without significant loss of quality and then decompressed on the local device, only the required workloads are rendered, and that the transmission of the rendered scene remains efficient and within the capacity of the network connection over which it is transmitted.

Given the reliance on network transmission, the remote rendering solution for the high-fidelity layer 250, 350, 550 may include fallback mechanisms. For example, in cases of intermittent connectivity or increased latency, the engine might temporarily switch to reduced rendering resolutions, interpolation, upscaling, LoD reduction, and/or an at least partial offload to local rendering to ensure that the user experience remains essentially uninterrupted, even if presented at a reduced quality. Scalability may be especially beneficial for users operating a smartphone as the local device, which may operate on a mobile network. Although network speeds increase with technologies like 5G, latency and connection interruptions may occur. Use of fallback mechanisms may advantageously mitigate the impact of network signal inconsistency and optimization of rendering priorities may maintain the capability to render and stream virtual environments with great detail via the high-fidelity layer 250, 350, 550.

In one example, provided for the purpose of clearly enabling an embodiment of this disclosure and not to limit this disclosure to only the illustrative rendering engine discussed throughout the example, the high-fidelity layer 250, 350, 550 may be rendered using a 3D rendering engine, such as Unreal Engine created by Epic Games, Inc. of Cary, NC. The Unreal Engine provides capability for rendering visually stunning, hyper-realistic environments, and photo-realistic scenes via the high-fidelity layer 250, 350, 550. Engines such as the Unreal Engine provide powerful tools, such as ray tracing and physically-based rendering, that can simulate behavior of light emission, generating realistic reflections, refractions, and shadows, making scenes appear more lifelike.

By leveraging a remote server, devices with limited computational power can access high-end Unreal Engine graphics without having to locally process them, as rendering is performed remotely on powerful servers equipped with advanced GPUs. These servers may run instances of an engine, such as Unreal Engine, process the required scenes, and then stream the output to user devices, for example, via rendered frame streaming. Use of such and engine provides access to a robust suite of tools, including the ability to import high-poly models and intricate textures, employ LoD techniques to render these assets with varying detail depending on their relevance and proximity to the viewer, and provide advanced visual features to improve the realism of a scene rendered on the high-fidelity layer 250, 350, 550.

Use of a rendering engine, such as the Unreal Engine in this example, may include features that promote a high-fidelity experience such as dynamic lighting and global illumination, physics simulations, ray casting, high sound fidelity, location calculation, directional reverb, enhanced behavior of simulated participants, improved avatar artificial intelligence, and other features that would be apparent to a person of ordinary skill in the art after having the benefit of this disclosure. One benefit of rendering the high-fidelity environment on a remote, high-powered machine is an ability to provide dynamic lighting. Shadow mapping, dynamic lighting, and ray tracing capabilities may be provided by the rendering engine to allow for realistic simulation of light as it interacts with different surfaces, producing natural global illumination, soft shadows, and believable reflections to increase immersion in the virtual environment of the high-fidelity layer 250, 350, 550. Another benefit of rendering the high-fidelity environment on a remote, high-powered machine is the increased physics simulations to enhance realistic interactions between objects, participants, and environments encountered during a session.

Visual scripting systems may be provided by engines, for example the Blueprints scripting system provided by Unreal Engine, can be used to design interactive elements in the virtual environment. In a remote setup, these scripting systems can be configured to anticipate user inputs, ensuring that interactivity is not compromised, even if minor network latency occurs. In scenarios with immense demand, multiple server instances running a rendering engine, such as the Unreal Engine, can be clustered together for load balancing and providing users a dedicated rendering pipeline.

In one embodiment, ray tracing features may be provided for computing navigational meshes and collision detection to provide realistic movement and interaction within the virtual space. A high-fidelity layer 250, 350, 550, when employing ray tracing remotely, can offer real-time adjustments to both navigational meshes and collision detection algorithms. For example, if a scene undergoes changes, ray tracing can essentially reevaluate light paths, navigable areas, and potential collisions in substantially real-time, ensuring the virtual environment remains responsive and realistic. Ray casting may additionally provide enhanced physics, sounds, and other environmental calculations to increase realism and provide a high-fidelity experience to a user.

Navigational meshes are tools used in 3D environments to map out navigable areas and define where characters or objects can move, ensuring they don't cross boundaries like walls or fall off ledges. Properly constructed navigational meshes may provide a blueprint for feasible movement within a scene. Traditional navigational mesh creation relies on simplified versions of the scene to determine navigable areas. By employing ray tracing, rendering on the high-fidelity layer 250, 350, 550 can produce more accurate navigational meshes tracing rays across the scene to identify walkable surfaces, ensuring that the navigation paths are true to the actual geometry of the rendered environment.

Collision detection ensures that virtual objects interact correctly with each other, preventing them from unrealistically overlapping or passing through each other. Ray tracing, by its very nature of simulating rays of light, can be used to detect intersections between objects. When an object moves, rays can be cast in its path to anticipate and confirm collisions, ensuring objects behave realistically within the space. Use of ray tracing techniques in collision detection advantageously increases accuracy by providing precise feedback about potential collisions, for example, by considering nonregular object shape, protrusions, or indentations in object surfaces when performing collision detection.

For end-users, the combination of ray-traced visuals with accurate navigation and collision systems advantageously provides an immersive and believable virtual experience via the rendered scene in the high-fidelity layer 250, 350, 550. For example, objects may move and interact as expected and the visual representation of the environment may align correctly with its navigational and interactive properties.

In one embodiment, ray tracing may additionally be provided to enhance the fidelity of light simulation. When employed in a high-fidelity layer 250, 350, 550 that remotely renders scenes, ray tracing may emulate the behavior of light by tracing rays of light as they travel from a source, bounce off objects, and eventually hit a viewer's eye (which may be simulated by a camera placed in the rendered scene). Using ray tracing techniques may improve the presentation of reflections, refractions, subsurface scattering, and shadows, which collectively contribute to the realism of a scene rendered for the high-fidelity layer 250, 350, 550. Use of ray tracing workflows may simulate global illumination of an environment, simulating the realistic lighting of spaces within a rendered environment from reflected, absorbed, or scattered light, enhancing the scene's overall realism.

In an example of rendering reflections, ray tracing can depict how light bounces off these surfaces such as water or other reflective surfaces, capturing other objects or even multiple reflections. In an example of rendering shadows, ray tracing can depict how light from multiple sources may be obscured and refracted by objects, providing varying degrees of softness based on the light source's distance and size to deliver natural-looking shadows by accounting for every light source, including indirect light. Additionally, shadows rendered using ray tracing techniques may ensure shadows fade realistically, adding depth to the scene. In an example of rendering transparent and/or refractive objects, light may be bent by simulating transmission of light through transparent, opaque, and uneven surfaces with precision. In an example of rendering subsurface scattering, ray tracing can simulate the effect of light passing through and scattering within translucent materials to appear softer and more natural, which may provide a different exit point from the material from where the light was received. Examples of materials that may benefit from subsurface scattering may include, without limitation, skin, paper, wax, frosted glass, marble, and/or other materials.

Ray tracing, while being capable of greatly enhancing the realism of a rendered environment, can be computationally intensive. Remotely rendering a scene with ray tracing in a high-fidelity layer 250, 350, 550 may take advantage of robust hardware, typically including high-end GPUs. By offloading this heavy computational task to remote servers, even devices with limited capabilities can display these ray-traced visuals. Adaptive techniques may be used to focus computational effort to efficiently render a scene. For example, areas of a scene with intricate reflections might receive more detailed ray tracing, while less complex areas may be rendered with reduced rays, balancing quality with performance.

In one embodiment, the textures, models, and other assets of an environment rendered on the high-fidelity layer 250, 350, 550 may be enhanced by use of photogrammetry, as will be appreciated by those of skill in the art. Photogrammetry involves making measurements from photographs, especially for determining the positions of surface points, by capturing multiple images of an object or environment from different angles. Environment scanning may be assisted by additional technologies, for example, light detection and ranging ("LIDAR"). In some embodiments, photogrammetry and LIDAR may be used in combination to provide a high level of environmental datapoints from which a simulated environment may be rendered. These images are then processed to extract depth information, reconstructing a three-dimensional representation of the object or environment. To accurately reconstruct a 3D model based on photogrammetry, a significant overlap may be provided between successive images to identify common points in multiple images needed to perform depth calculations. Once images are captured, software algorithms may identify and match features across different photographs as reference points for depth and spatial calculations. A 3D mesh may be created having a collection of vertices, edges, and faces that define the shape of the 3D object or environment in detail. Textures may then be mapped onto the mesh using the original photographs to recreate the shape, colors, and details of the real-world object or environment.

In one embodiment, asset libraries may be connected to and accessed by the rendering engine that produces the contents of the high-fidelity layer 250, 350, 550. In an example that uses Unreal Engine as the rendering engine, the Quixel (formerly known as Megascans) library of high-fidelity assets may provide a streamlined approach to 3D content creation by providing an extensive collection of 3D assets, materials, and textures created using real-world scans. Example assets may include, without limitation, rocks, foliage, ground materials, man-made objects, environments, surfaces, and other assets that would be appreciated by those of skill in the art. Asset libraries such as Quixel may be compatible with popular game engines and 3D software, such as via a plugin for software like Unreal Engine and Unity.

Managing the latency for delivery of the high-fidelity layer 250, 350, 550 will now be discussed, without limitation. Reducing latency in remotely rendered 3D environments is advantageous for maintaining immersion and ensuring a responsive user experience. Latency reduction may include solutions such as physical proximity to render servers, compression, adaptive bitrate streaming, protocol optimization, providing efficient render pipelines, and other techniques that would be appreciated by a person of skill in the art after having the benefit of this disclosure.

Latency may be reduced by locating a data center or other server rendering the high-fidelity closer to the end-user. By leveraging multiple content delivery networks (CDNs), data can be strategically rendered using instances at various or multiple geographical locations to deliver rendered data from the nearest point to reduce transfer times and thereby reduce latency. Compression may also be used to reduce the data packets to be sent over the network. Advanced compression algorithms can reduce the size of 3D assets and scenes without significant loss of quality, which may be compressed prior to transmission and decompressed by the local device, providing faster delivery and reduced latency. Adaptive network streaming may also dynamically adjust the quality of the streamed content based on the user's network conditions, reducing the quality during poor network conditions and increasing it during optimal conditions to promote a consistent and low-latency experience. Optimized protocols like WebRTC, QUIC, UDP, and other protocols that will be appreciated by those having skill in the art may be used to further reduce latency, making them ideal for delivery of remotely rendered 3D environments in substantially real-time.

On the server side, having an efficient rendering pipeline can reduce the time taken to prepare each frame for transmission, which may include optimizing shaders, reducing unnecessary calculations, and employing techniques like occlusion culling to prioritize rendering resources to only that which will be perceptible by a user. Predictive algorithms can anticipate user actions or viewpoints and pre-render certain parts of the 3D environment. By preemptively rendering potential frames, the system can swiftly push them to the user, further reducing perceived latency. Differential or delta rendering may be used, which sends only the changes or differences between consecutive frames, as opposed to full frames, reducing the amount of data transferred. Techniques like chroma subsampling, which take advantage of human visual perception, can additionally reduce data rates without a significant perceived drop in quality.

On the user device, techniques can be used to predict the next movement or action of the user. For example, if the user begins turning their head to the left, the client can start displaying the left portion of the environment, even before fully receiving the next set of frames, reducing perceived latency.

The local layer 260, 360, 660 will now be discussed generally, with reference to the figures shown in the accompanying drawings. The local layer 260, 360, 660 may include features and assets rendered by the user device locally. Products rendered on the local layer 260, 360, 660 may be virtually combined with received streams including the high-fidelity layer 250, 350, 550, audiovisual information provided by the communication layer 270, 370, 770, and interactive features provided by the interface and control layer 280, 380, 880. Movement of assets included by the local layer 260, 360, 660 may be substantially synchronized with the high-fidelity layer 250, 350, 550 to be presented to the user as a single, synchronized audiovisual experience.

In one embodiment, a representation of a user within the high-fidelity environment may be provided as an avatar imposed on the high-fidelity layer 250, 350, 550, such to simulate being located within the high-fidelity environment. For example, the user may be represented by an avatar, such as a Linkpad, that is capable of spatially representing position, a video feed of the user associated with the Linkpad, audio of the user, and other user attributes that would be appreciated by a person of skill in the art after having the benefit of this disclosure.

The assets rendered for the local layer 260, 360, 660 may be aligned with the environment provided via the high-fidelity layer 250, 350, 550 to promote a consistent, immersive experience. When integrating these two layers, a position in the local environment may be agreed upon between the layers to correspond precisely to the expected position in the remotely streamed space. Standardizing units of measurement, origin points, and axis orientations may assist with coordinating position between the local layer 260, 360, 660 and high-fidelity layer 250, 350, 550.

Metadata may be provided for each layer detailing its size, orientation, and position of assets within the environment. This metadata may ensure assets are correctly scaled and positioned when rendered, maintaining spatial consistency across layers. Calibration procedures may be used to align locally rendered assets with specific reference points from the remotely streamed environment, which may act as spatial anchors to assist with accurate placement of local assets. Alignment of local and remote assets may be monitored, and adjustments may be made to ensure spatial consistency is maintained.

Predictive rendering may be used to anticipate user movements or interactions, assisting the system to preemptively adjust the positioning of locally rendered assets, ensuring they remain synchronized with the remote scene. If misalignment is detected between local and remote assets, a feedback event may be triggered. This feedback event may automatically recalibrate the alignment, keeping the overall spatial experience consistent.

Smooth transitions between local and remotely rendered assets can be assisted through layer blending techniques. For example, if a locally rendered object overlaps a remote asset, soft edges, shadows, or gradual opacity changes can mask the transition, ensuring the overall scene feels unified. Temporal synchronization may coordinate assets with respect to time. For example, if an event occurs in the remote high-fidelity environment, like an explosion, may coincide with a local effect, like screen shake, ensuring these are temporally synchronized enhances immersion. Timestamps and time-coding can be employed to achieve temporal synchronization.

To further enhance the alignment of assets, spatial audio can position locally rendered assets by sound. Ensuring that the audio's origin and directionality match an asset's position can offer another layer of verification and enhance a sense of presence within the remote high-fidelity environment.

Determination of when a locally rendered asset obscures a view of, or is obscured by, an asset in the remotely rendered high-fidelity layer 250, 350, 550 will now be discussed. In one example, obstruction detection may use depth buffering to determine which objects are in front of others. Each pixel on an object may have a depth value, which may be checked when rendering against a depth value stored in a depth buffer to decide which pixel should be displayed to the user. If the locally rendered asset has a shallower depth (closer to the viewer) than the remotely rendered high-fidelity layer 250, 350, 550 at a particular pixel, it can obscure the video. Conversely, if the locally rendered asset has a deeper depth (farther to the viewer) than the remotely rendered high-fidelity layer 250, 350, 550 at a particular pixel, the video can obscure the local asset.

Z-ordering may also be used to determine which assets are rendered on top. For example, items with a higher Z-order value can be rendered above those with a lower value. If a locally rendered asset has a higher Z-order than the remote video layer, the locally rendered asset can be drawn on top of the high-fidelity layer 250, 350, 550.

In another example, a preliminary check may be performed using axis-aligned bounding boxes (AABB) around assets. By comparing the AABB of a locally rendered asset and the projected boundaries of the remotely rendered video layer, potential overlaps may be determined without examining each pixel.

In another example, occlusion culling may determine which objects are obscured from the viewer's perspective. Occlusion culling may advantageously decide which assets experience occlusion, thus not needing to be rendered by the local device to improve performance. Occlusion culling may additionally be employed to detect when the local asset obscures the remote video, which can reduce rendering requirements at the server. Colliders may additionally be used for detecting interactions and collisions, such as when a locally rendered object comes into contact with the projected area of a remote high-fidelity layer 250, 350, 550 and indicate that the locally rendered object is at least partially obscured and omit rendering of the obscured portions.

Assets can be semi-transparent, partially allowing the high-fidelity layer 250, 350, 550 beneath the local layer 260, 360, 660 to be displayed in altered presentation. In such scenarios, blend modes and alpha values of the pixels may affect how much of the remote video layer is visible. In another example, a locally rendered asset could cast a shadow onto a remotely rendered high-fidelity layer 250, 350, 550. Monitoring shadow maps and light paths can help determine when such indirect occlusions occur.

Synchronization between the contents provided through the high-fidelity layer 250, 350, 550 and local layer 260, 360, 660 may be monitored and managed to eliminate or reduce jitter. Timestamp consistency may be promoted, wherein frames rendered locally and remotely rendered may be stamped with a consistent time-code. Timestamping ensures synchronization across the entire scene by making corrective adjustments when discrepancies between local and remote render timings are detected, mitigating visual stutter. Adaptive resolution scaling may be applied to reduce inconsistent frame rates between local and remote assets. By dynamically adjusting the resolution of locally rendered assets based on the current frame rate of the remotely rendered content, a more consistent presentation may be provided to the user.

Upscaling techniques may be applied to rendered frames to improve the high-fidelity feed provided via the high-fidelity layer 250, 350, 550. Upscaling techniques may additionally include, without limitation, temporal upscaling of rendered frames to supplement details that may be assumed by analyzing multiple rendered frames over time, machine learning solutions that may supplement detail by learning from rendered frames and predicting additional detail to enhance the output, or additional upscaling techniques that would be appreciated by a person of skill in the art after having the benefit of this disclosure. Rendered frame conditioning techniques may additionally enhance the fluidity of a high-fidelity experience and may include, without limitation, frame generation temporal solutions that may inject interpolated frames between rendered frames, machine learning solutions that may inject predicted frames between rendered frames, or additional frame prediction techniques that would be appreciated by a person of skill in the art after having the benefit of this disclosure. Additionally, predictive algorithms can anticipate the next frame or set of frames by preemptively rendering potential subsequent frames. Furthermore, one or more filters, such as sharpening filters may be applied to the generated high-fidelity environment, which may occur at the high-fidelity layer 250, 350, 550, local layer 260, 360, 660, and/or a combination of layers.

Monitoring network quality allows the system to make adaptive decisions if network fluctuations are detected. For example, if the bandwidth drops or latency increases, the system can prioritize local rendering, reduce the complexity of rendered assets, or employ other strategies to maintain visual consistency. Frame rates may be locked for local and/or remotely rendered assets to ensure both rendering sources output frames at the same consistent rate regardless of scene complexity. In situations where frames are delayed or lost, interpolation may analyze the frames before and after the missing frame, generate a "best guess" interpolated frame, and create a smoother visual experience by mitigating data inconsistencies that may occur.

In one embodiment, latency differences between local rendering and remote streaming may be mitigated by introducing a slight delay in presenting locally rendered frames, ensuring they align seamlessly with the remotely streamed high-fidelity content. Advanced systems can dynamically adjust this delay based on real-time latency measurements. Feedback loops may be established between the system rendering the local layer 260, 360, 660 and the server rendering the high-fidelity layer 250, 350, 550 to aid in actively managing jitter. If jitter or inconsistencies in synchronization are detected, the server may adjust its streaming parameters, like compression levels or frame rate, to better suit the current conditions at the local device.

The communication layer 270, 370, 770 will now be discussed generally, with reference to the figures shown in the accompanying drawings. The communication layer 270, 370, 770 may provide audio and visual content relating to the operator of the local machine, for example, a video stream captured from the user's webcam and/or audio captured from the user's microphone. Information associated with the communication layer 270, 370, 770 may be exchanged with other users via a peer-to-peer connection, without limitation.

In one example, a video feed of a user participating in a conferencing event may have their video applied to an avatar, such as a Linkpad, rendered by the local machine in the environment streamed through the high-fidelity layer 250, 350, 550. The video feed may be positioned, oriented, scaled, transformed, obscured, and/or otherwise manipulated to maintain a consistent association with the avatar. Audio from the user may also be provided via the communication layer 270, 370, 770 and associated with the avatar presented by the local layer 260, 360, 660. In some embodiments, the audio may be spatially adjusted such as to reflect the user's location within the virtual environment. Spatial and other audio adjustments may include, without limitation, volume level adjustment, echo, reverb, obstruction, equalizers, doppler, amplitude compression, normalization, background sound removal, cleaning source audio, and/or other adjustments that would be apparent to a person of skill in the art after having the benefit of this disclosure.

In one example, contents associated with the communication layer 270, 370, 770 may be communicated via a peer-to-peer connection between users. For example, and provided without limitation, a dedicated instance for each session may be operated via a signaling server, which may include cross-platform applications and self-hosted backends, such as provided through Photon by Exit Games Inc. of Portland, OR. Skilled artisans will appreciate that discussions in the context of Photon are provided as an example, and that various other platforms or solutions with comparable features may be used in place of or in connection with Photon, without limitation. Photon or another signaling server helps to ensure that each interaction, session, or communication sequence may occur in an isolated environment, which may improve the security, performance, and customization of each session.

Operation of the communication layer 270, 370, 770 may begin with initializing a session. For example, when a user or a group of users initiates a session, a request may be sent to the server infrastructure. This could be a virtual meet-up, a video call, teleconference, and/or other interactive session. In response to this request, the server system, be it Photon or another signaling platform, may dynamically allocate resources and create a new server instance, which may manage the real-time interactions and data flow for that session. In cloud-based infrastructures, virtual machines or containerized environments can be used and provide rapid deployment of server instances on-demand. Use of dedicated instances advantageously manages activities in one session such that they do not negatively impact another session. By isolating sessions, intensive computation, unexpected errors, or resource spikes in one instance can be managed as not to affect other sessions, which can be particularly valuable in real-time applications, such as with multi-layered systems as described throughout this disclosure, where consistent performance is paramount. Moreover, such isolation enhances security since potential breaches or vulnerabilities in one session remain contained without compromising the entire system.

Maintaining separate instances for each session may allow server settings and resources to be tailored to the needs of that session. For example, a conferencing session with hundreds of participants might require more intensive checks and balances, higher server tick-rates, or advanced operational management operations than a one-on-one conversation. Additionally, as the user base grows, the system can be scaled horizontally by committing more instances to be run parallelly, spreading the load and ensuring consistent performance for the user.

Once a session concludes, the associated server instance can be safely terminated. Modern signaling servers, including Photon, typically incorporate automated cleanup routines that purge temporary data and free resources after an instance is terminated to be available for future sessions. In cloud environments, this elasticity is particularly beneficial in managing costs and maintaining high service availability. Employing dedicated server instances for individual sessions advantageously provides a combination of performance, security, and customization benefits. With the rise of cloud computing and containerization, this approach has become increasingly feasible, even for applications with large user bases or high-frequency session initiation.

The interface and control layer 280, 380, 880 will now be discussed generally, with reference to the figures shown in the accompanying drawings. Conferencing and video content delivery platforms have risen in prominence, becoming essential tools for collaboration, education, and social interaction. The interface and control layer 280, 380, 880 may provide various interface features and controls to ensure user-friendliness, functionality, and versatility. The interface and control layer 280, 380, 880 may include various features for controlling the user session, manipulating the world within which the conferencing event or other event is occurring, using tools with a conferencing session, controlling access to local hardware such as camera or microphone, and otherwise affecting a session.

The interface and control layer 280, 380, 880 may include a user dashboard. For example, a user may be greeted with a personalized dashboard upon logging in. This space may display upcoming meetings, recent recordings, contacts, and other relevant data, without limitation. A user-friendly dashboard gives attendees an overview of their engagements and streamlines navigation. Additional controls available through the user dashboard may include session management, invitations to join a session, fidelity settings, preferences, privacy options, account control, and other options and controls that would be appreciated by a person of skill in the art after having the benefit of this disclosure. In some embodiments, one or more interface and/or user interaction features may be rendered by and provided from the high-fidelity layer 250, 350, 550, which may be used to provide a hybrid interface presentation, without limitation. In some embodiments, interface aspects may be layered upon a transparent background via an instance of a high-fidelity rendered output and provided as an additional layer associated with the high-fidelity experience.

While participating in a session, controls may be provided via the interface and control layer 280, 380, 880 for participants to join or leave a session. Active speakers might be highlighted or enlarged to focus attendee attention. Mute and unmute options may be provided such that users may toggle their microphone on or off, and a visual indicator (like a microphone icon) may be displayed to participants of the current mute status. Advanced platforms may also offer noise suppression or background blur features, which may be toggled and/or indicated via interactive elements of the interface and control layer 280, 380, 880.

In one embodiment, a space for text communication may allow participants to share information without interrupting the speaker. Features might include direct messaging, file sharing, chat, and links to relevant resources. Additionally, such a space may advantageously allow a speaker to gather information from polling, Q&A, dynamic feedback, interactions such as "thumbs up," and other interactive engagements.

In one embodiment, users may be able to share their screen or specific application windows with others. Screen sharing may be provided as a pop-up window, affixed to an avatar for the shared screen that is rendered within the virtualized environment, displayed on a virtual presentation board or monitor rendered within the virtual environment, or otherwise displayed, without limitation. Presentations, demonstrations, or collaborative work may be integrated into the virtualized environment, which may be rendered remotely and communicated via the high-fidelity layer 250, 350, 550 after being enabled via a toggle provided by the interface and control layer 280, 380, 880. In another embodiment, presentations, demonstrations, or collaborative work may be associated with a Linkpad or other avatar rendered on the local layer 260, 360, 660, with the contents of the presentation being shared via the communication layer 270, 370, 770 and coordinated with the location of the Linkpad or other avatar. In some embodiments, users may share multiple pieces of content, and/or multiple users may be able to share contents substantially simultaneously, for example, being located at different positions within the virtualized environment.

In one embodiment, a recording control may be provided to allow sessions to be captured for future reference. Once activated, various aspects of the conference, including the content from each layer, from high-fidelity pixel streamed video feeds to shared screens, may be recorded. In some versions, participants may be notified when recording begins to ensure privacy.

In one embodiment, users can "raise their hand" to indicate a desire to speak. Engaging with a "raise your hand" feature may alert the moderator or presenter that a user would like to contribute to the conversation. Controls may be provided to the moderator to grant speaking privileges or address questions in a structured manner. Additional indications from participants may include thumbs up, thumbs down, exclamation marks, question marks, smiley face, disapproval, laughing reactions, heart symbols, emoji interactions, emotes, and/or other interactions that would be appreciated by a person of skill in the art after having the benefit of this disclosure.

In one embodiment, a participant list may be shared with users. Participation management features may also be provided to a moderator, speaker, and/or another user. Hosts and moderators may be provided advanced access to a list of all participants, which may include advanced controls that may include the ability to mute or remove disruptive users, promote attendees to presenter status, or organize breakout rooms for smaller group discussions. A lecturer, for instance, might divide students into breakout rooms for group work, then reconvene everyone to the main room for discussion. In examples with breakout rooms, a smaller group space may be provided within the main conference for a side conversation or caucus. A breakout room may be simulated in the virtual environment as a room, may transport participants of the breakout room to a new virtualized environment, or otherwise be distinguished from the main session as would be appreciated by a person of skill in the art after having the benefit of this disclosure.

In one embodiment, polls and feedback tools may be provided to users. To engage participants and gather instant feedback, hosts may be able to launch polls or surveys. Results may be selectively displayed in real-time, facilitating interactive discussions or decision-making. In one embodiment, a platform enabled by this disclosure may provide users with many options to communicate within the platform. A general communication modality may include all users communicating freely within a session. Alternatively, a subset of those users may wish to host a caucus or other private communication exchange, for example, via text, audio, and/or video.

In one example, users may request access to private chats with another user, for example text chats, which would be initiated upon the requested user granting the access. A requesting user may invite multiple users to join a "private" channel, for example, simultaneously, at one time, or by groups. Each requested user may then decide if they want to join that channel. In another example, private channels may be associated with bounded areas associated with interactive objects within a simulated environment. For example, a table with chairs may be rendered in the environment that, if a user interacts with the table and chairs, assuming permissions allow, they may be prompted to "sit" at the table to enable private channel audio and/or text feeds with other users "sitting" at the table, such that the remaining general users within the environment cannot listen to the conversation conducted through the private session of users sitting at the table.

Session management will now be discussed in greater detail, without limitation. Signaling servers may assist with orchestrating and managing interactive features within a real-time session. The signaling server may facilitate and synchronize various interactive actions to ensure a seamless experience for all participants. Session management features can be woven into each session, for example, including network messaging, virtual locations, join and leave actions, session controls, and other management features, without limitation.

Session management features may include network messaging, which can include the ability to send and receive messages between participants in real-time. The signaling server may manage this by maintaining a continuous connection with each participant's device. When a user performs an action or sends a message, this can be relayed to the server, which then broadcasts or routes this message to the appropriate recipients. In this configuration, the signaling server acts as a central hub, ensuring that every user receives timely updates about the activities within the communication session. Maintaining real-time and accurate exchanges of such data may facilitate synchronization of sessions among various users and enable real-time communication.

Data synchronization features may be provided to coordinate sharing a document, presenting a slide, transmitting an audiovisual feed of a participant, or watching a video using network messaging such that each participant views the same content at the same time. Messages transmitted across the network may carry metadata that keeps the user experience consistent. Real-time communication may advantageously facilitate simulated in-person discourse, enabled by real-time interactions and shared experiences. Network messaging may operate in the background, transmitting voice, video, and text data packets between users, providing the real-time communication experience. Advanced platforms may employ techniques such as low-latency messaging to ensure minimal delay, making digital interactions feel as natural as in-person conversations.

Network messaging may additionally include the interactive features such as raising a virtual hand, conducting polls, or initiating Q&A sessions discussed above. When a user raises a hand, a message may be sent to the host's device, notifying them of the participant's intention. Similarly, when a poll is conducted, users may submit their responses, which are then aggregated and presented in real-time, which may be facilitated by network messaging.

Network messaging may additionally monitor connection quality. For example, if a participant's connection is weak, messages sent from their device can inform the platform of this instability. The platform can then adjust the video and audio quality, for example by reducing resolution and/or transmission bitrate, to ensure continuous communication. Adaptive quality controls can provide consistent experience, even in suboptimal network conditions.

Network messaging may additionally assist with session management. For example, when users join and/or leave a conference, network messages may be exchanged to manage the communication session. For instance, when a new participant joins, a message may be sent to existing participants to update their user list. If a user is removed or loses connection, network messaging may provide an update to the participant list while the communication session continues without disruption, which may also update the user interface to reflect these changes.

In some embodiments, network messaging may transmit data over an encrypted channel. For example, using protocols like DTLS and SRTP that may be provided through WebRTC, communication and data exchanges can be encrypted, ensuring privacy and security for users. For example, data exchanges between participants may be end-to-end encrypted, which may enhance the privacy of the data contents that is encrypted before transmission to be decrypted and understood by the intended recipients, safeguarding user privacy. In some embodiments, data may be encrypted in transit, at rest, and/or otherwise as will be appreciated by those of skill in the art.

Session instances may be rendered via a web interface, which may be provided via a dedicated client application, browser operation on a client system, or another delivery platform. Creating a conferencing environment that combines both remotely rendered high-fidelity layer 250, 350, 550s and locally rendered assets may be provided as a seamless and rich user experience, irrespective of the underlying complexity of content delivery and synchronization. An example of content delivery via browser will be discussed below, without limitation. In some embodiments, messages may be recorded for later delivery to another user.

Content delivery may begin by establishing a base framework. For example, a first step may include providing a robust web framework in place, such as based on popular web development platforms like WebRTC for real-time communication and WebGL, Node.js, or Three.js for rendering 3D content in browsers. A combination of HTML, CSS, and JavaScript may also be used to set up the basic UI and UX of the conferencing platform. Remotely rendered content may be delivered via the high-fidelity layer 250, 350, 550 by being compressed and streamed to users in real-time using video streaming protocols suitable for low latency, such as WebRTC or MPEG-DASH, without limitation.

Locally rendered assets may be integrated into the local layer 260, 360, 660. For example, on the client side, the browser may utilize WebGL, WebGPU, or another protocol to render user-specific assets. Examples of assets include avatars, Linkpads, UI overlays, or other interactive elements. These elements are layered on top of the streamed high-fidelity layer 250, 350, 550, ensuring a blend of both global and user-specific visuals. Contents transmitted via the communication layer 270, 370, 770 may additionally be applied to the assets on the local layer 260, 360, 660, with the interface features being provided on the interface and control layer 280, 380, 880.

The various layers may be synchronized to create a single cohesive presentation. For example, remotely rendered, locally rendered, and peer-to-peer content respective to each layer may be synchronized such that they appear to exist as a single rendered event. Timestamps or frame markers can be used to synchronize the layers, making sure that each layer exists in temporal harmony. Skilled artisans will appreciate that additional layers may be added to the platform, without limitation.

For audio and video communication, the browser may leverage a protocol such as WebRTC for peer-to-peer communication, enabling video chats and voice calls on the communication layer 270, 370, 770. Advanced noise reduction, echo cancellation, and bandwidth adaptation algorithms may also be included to ensure clear and smooth communication that is agnostic to network conditions. To enhance realism, spatial audio can be integrated, for example, by determining the position of locally rendered assets like avatars in the virtual space. Audio can be spatially adjusted to sound like it's coming from specific positions, with consideration to the direction the avatar is facing and the echo or reverberation effects of the virtual environment in which the avatar exists. Web Audio APIs and/or other interfaces may provide functionalities to achieve this immersive audio experience. In some embodiments, spatiality of audio and video communication may be at least partially rendered via the high-fidelity layer 250, 350, 550 and augmented into the content rendered via the browser.

The user interface may be provided via the interface and control layer 280, 380, 880 via protocols such as HTML5 and CSS3. In some embodiments, interface aspects may be combined with JavaScript libraries like React or Vue.js, which can provide responsive and intuitive UIs. Event handlers can detect user actions like clicks, drags, or keyboard inputs. In additional embodiments, motion controls, touch controls, accelerometer, force, elevation, other sensor-driven inputs, and other actions that would be appreciated by those of skill in the art. For example, JavaScript event listeners may handle inputs to affect actions in the virtualized environment, for example, moving a locally rendered avatar, adjusting the view of the high-fidelity layer 250, 350, 550, or interacting with UI elements.

Session instance management will now be discussed. The architecture of conferencing platforms, especially those catering to a vast number of users, often relies on distributed systems to ensure scalability, reliability, and efficient resource allocation. Utilizing a model where each session exists on its own server instance can be extremely beneficial. Leveraging elastic computing platforms, for example Amazon's Elastic Compute Cloud (EC2), can facilitate session management via isolated environments, scalability, and other benefits.

For example, session management may provide isolated environments. By placing each conferencing session on a separate instance, for example being EC2 instances, each session or conference event may be assigned an isolated environment to ensure that the activities or the load of one session do not negatively impact another. For sensitive meetings, this model can also provide an additional layer of security, reducing the risk of data leaks between sessions. Session management may additionally provide dynamic scalability. In an example using EC2, as the demand for new sessions increases, new instances can be provisioned in real-time, catering to this demand. Conversely, as sessions conclude, instances can be terminated independently, ensuring optimal resource utilization.

Using session instance management, a system enabled by this disclosure may advantageously customize resource allocation. For example, different conferencing sessions may have varying demands. A one-on-one meeting might need minimal resources compared to a webinar with thousands of attendees in a virtual environment, allowing elastic compute to allocate only the resources needed to provide the experience. In another example, an instance may be included by large scale experiences in which a large number of users can interact with one another and the surrounding environment, each of which user may be engaging with the high-fidelity experience via their own instances, scaled via elastic compute relative to the computing demand. Using elastic compute, instances with different capacities (for example memory, CPU, bandwidth) can be allocated based on the expected size and nature of the communication session, ensuring efficiency. Load balancing may also be used to distribute incoming session initiation requests across multiple instances, ensuring that no single elastic compute instance is overwhelmed and maintaining a smooth user experience.

Elastic compute instances may be configured with the necessary storage to handle session recordings, chat logs, and shared files. By segmenting storage at the communication session level, data retrieval, backup, and deletion processes may become more organized and efficient. Session interaction and the resulting data may be protected using robust security configurations. For example, with sessions on separate instances, security rules, and policies can be tailored to a desired level for each session, customer, host, participant, or other factor. For instance, a board meeting might employ stricter firewall rules and access controls compared to a public seminar.

Session instances may be monitored for real-time insights into performance metrics like CPU utilization, data transfer rates, and instance health. If an instance faces issues, manual or automated actions like rebooting the instance or shifting the communication session can be initiated. In some embodiments, monitoring may assist with moderation efforts. In one embodiment, additional instances may be spooled up and/or down to meet dynamic demands.

Audio handling will now be discussed, without limitation. Aspects of a system enabled by this disclosure may provide handling of audio content in the communication layer 270, 370, 770. This innovation can lead to improved audio quality, reduced latency, and enhanced overall user experience. Audio handling may be delivered to a user via a communication layer 270, 370, 770 that interfaces with the high-fidelity layer 250, 350, 550, local layer 260, 360, 660, and interface and control layer 280, 380, 880. This communication layer 270, 370, 770 can manage audio content in real-time, ensuring that audio data packets are appropriately processed, compressed, and transmitted with minimal delay. In some embodiments, audio may originate from multiple sources, for example, communications, music, sound effects, embedded with video feeds, and/or other sources.

Audio handling may use compression features, for example, an adaptive compression algorithm that gauges the available bandwidth and modifies compression rates accordingly. By dynamically adjusting compression, the system may ensure optimal audio quality while reducing bandwidth usage when necessary. Noise cancellation may additionally be provided by detecting and filtering ambient noises, enhancing clarity, and reducing disturbances during a conference.

In some embodiments, an echo reduction operation may additionally detect and minimize audio feedback loops, reducing instances of echo in the conferencing and/or video content delivery environment. In some embodiments, audio handling may identify and prioritize a preferred set of audio sources, ensuring that key speakers or predefined audio signals are given prominence and are less likely to experience dropouts or interruptions. In some embodiments, audio buffering may be provided. For example, if a delay is detected, the system may temporarily store audio data packets, ensuring that they are played in sequence. The synchronization algorithm may work in tandem with video data to provide a cohesive and synchronous audiovisual experience.

Audio handling may include the use of spatial audio, sometimes referred to as 3D sound or binaural audio, to offer a more immersive and realistic audio experience by simulating the way humans perceive sound in the real world. Applying spatial audio in rendered frame streaming environments can greatly enhance user engagement and immersion. Spatial audio processing may consider aspects like direction, distance, environment acoustics, and movement to project a sound source to a location within the virtualized environment, be it from above, behind, or virtually any other direction.

Spatial audio may also be provided via the communication layer 270, 370, 770, such as via a sound source file, enhancing the perception that the participant is speaking from a spatial position within the virtualized environment displayed on the high-fidelity layer 250, 350, 550 and not just as a flat or normalized sound agnostic to user position. In some embodiments, the option to use spatial audio may be toggled by a user, for example, to improve accessibility. On the communication layer 270, 370, 770, audio may be received by a participant user, such as without spatial adaptation being applied. The user audio may then be processed to relate it to a space or location in the virtualized space, such as to replicate how other users may perceive sounds from the speaker as if they were present in a three-dimensional space. In some embodiments, spatialization may include communication with the high-fidelity layer 250, 350, 550, including the engine producing rendered frames via the high-fidelity layer 250, 350, 550. For example, the high-fidelity layer 250, 350, 550 and/or local layer 260, 360, 660 may receive audio content via the communication layer 270, 370, 770 and transform the audio being presented to the user with the desired spatiality.

Processing of spatial audio may begin by identifying sound-producing elements within the virtual environment as audio sources. The location and movement of the audio sources may then be tracked in real-time, allowing for the dynamic rendering of spatial audio based on the user's position and orientation relative to these sources. As the user moves or looks around, the audio environment may adjust accordingly to reflect the new perspective. In situations where the connection may not support high-quality spatial audio streaming, a fallback to traditional stereo or mono audio may be provided. While less immersive than spatial audio, traditional audio delivery advantageously ensures that the user still receives an audio component without interruptions.

In some embodiments, spatial audio processing may consider environmental acoustics. Beyond just position, real-world sound is also influenced by the environment. Sound behaves differently in a vast open field compared to a closed room. Using techniques like convolution reverb, which simulates how sound reverberates in different spaces, audio processing can reproduce environmental effects in the virtualized environment from assets rendered for the high-fidelity layer 250, 350, 550, speakers' communication via the communication layer 270, 370, 770, or otherwise as would be appreciated by those of skill in the art.

In one example, audio and video handling may be provided via a plugin to a versatile platform for providing real-time engagement APIs, particularly for voice, video, and live broadcasting. Such audio handling platform may facilitate incorporation of a robust infrastructure that allows integration of high-quality voice and video communication into their applications with relative ease. For example, an audio and video handling platform may be used to adapt in real-time to varying network conditions and automatically adjust the audio and video quality to prevent call drops. This adaptive streaming ensures that even in less-than-ideal situations, the communication session can proceed without significant interruptions.

The interoperability between layers will now be discussed in greater detail, without limitation. FIGS. 2-8 highlight examples of the interoperability between layers, which may also be shown in other figures. Referring now to block diagram 200 of FIG. 2, an example of multiple layers that may be presented to a user include the high-fidelity layer 250, 350, 550, local layer 260, 360, 660, communication layer 270, 370, 770, and interface and control layer 280, 380, 880. Those of skill in the art will appreciate that additional layers may be provided in some embodiments, without limitation.

As discussed above, the high-fidelity layer 250, 350, 550 may be displayed to present a rendered virtualized environment, for example, created using a server connected via a network. The high-fidelity layer 250, 350, 550 may include the audiovisual information of the rendered environment along with additional data to help with synchronization of the other layers, such that the product of multiple layers will be presented to the user as one cohesive experience.

As discussed above, the local layer 260, 360, 660 may also be displayed, which may be processed on the local device of a user. The local layer 260, 360, 660 may include assets representative of user positions within the three-dimensional virtualized environment rendered and delivered via the high-fidelity layer 250, 350, 550. The local layer 260, 360, 660 may additionally include data to assist with synchronization and interaction with the other layers. For example, a user's avatar may virtually move behind an object or wall displayed in the high-fidelity layer 250, 350, 550. The position data shared between the high-fidelity layer 250, 350, 550 and the local layer 260, 360, 660 may assist with determining occlusion of the avatar for the person to respect the geometry of the streamed high-fidelity layer 250, 350, 550 such to increase realism and simulate the actual properties as if the final product of layers were rendered as a single point of view.

As discussed above, the communication layer 270, 370, 770 may also be provided to facilitate interaction among the users in a session and facilitate communication. The communication layer 270, 370, 770 may be provided using a peer-to-peer connection, which may advantageously reduce latency and promote real-time communication between users. The communication layer 270, 370, 770 may provide audio content representing a user speaking and/or during presentation.

The communication layer 270, 370, 770 may additionally include video feeds of the user, which may be incorporated with the avatar provided through the local layer 260, 360, 660 as one dynamic avatar asset. In one example, a user may be unable to distinguish that the combined avatar, audio, and video assets are delivered over multiple layers. The communication layer 270, 370, 770 may include location data to assist with processing of spatial audio, light transformations, and other effects to integrate the operations of the communication layer 270, 370, 770 with the events occurring in the other layers such as the local layer 260, 360, 660 or the high-fidelity layer 250, 350, 550.

As discussed above, the interface and control layer 280, 380, 880 may provide users with tools and options to control a session, alter the parameters of a session, and manage attendance and other administrative features related to the communication session, without limitation.

Figure 3:
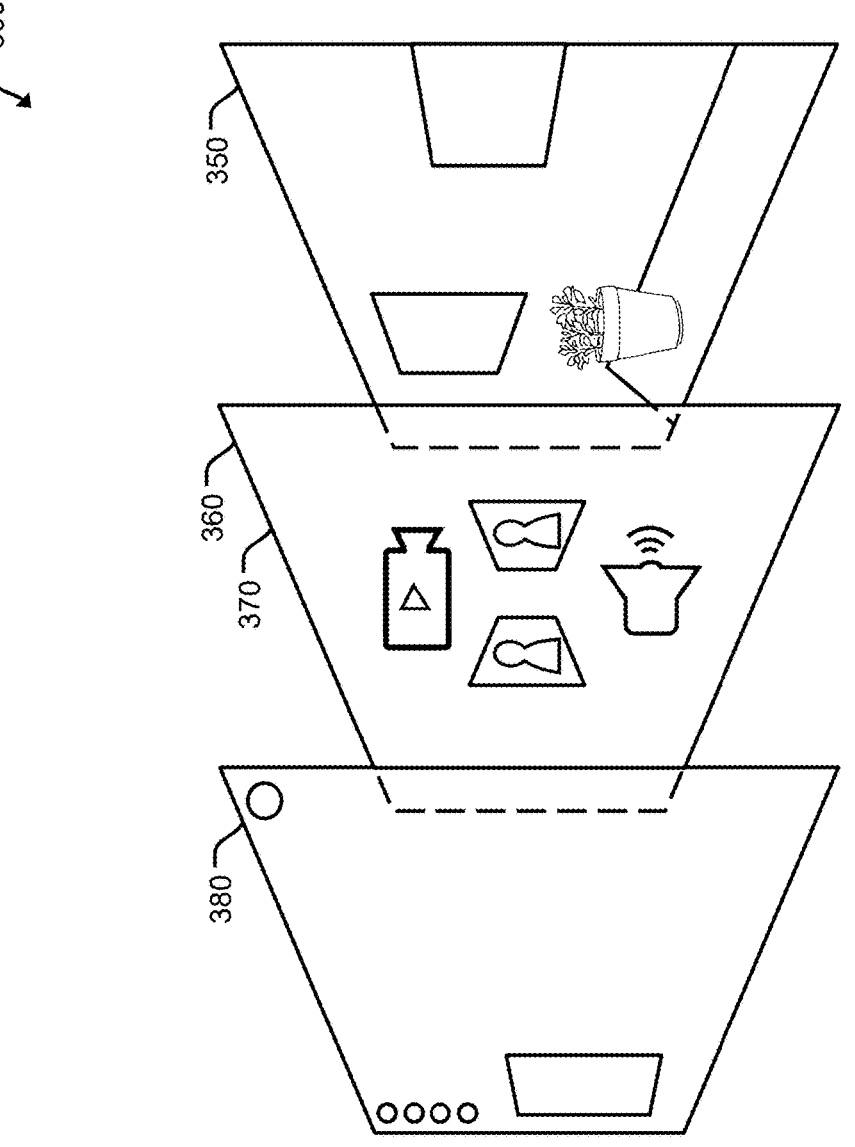
FIG. 3 is a diagram view of various layers of an illustrative conferencing system provided by various rendering resources, according to an embodiment of this disclosure.

Referring now to block diagram 300 of FIG. 3, an illustrated application of the various layers discussed above is provided. In this example, a rendered three-dimensional virtualized environment is illustrated in the rightmost block. This environment may be provided to the user via the high-fidelity layer 250, 350, 550 and may include a realistic, high-quality environment rendered remotely using a server that includes high-powered hardware. By providing A remotely rendered three-dimensional virtualized environment, a platform enabled by this disclosure may advantageously allow robust conferencing and/or video content delivery environments without requiring each user to possess and operate demanding computing hardware.

Referring still to FIG. 3, pictured in the middle block, an avatar representing a user may be adapted to appear as if they exist in a position within the environment displayed via the high-fidelity layer 250, 350, 550. The avatars may be rendered using local hardware in the local layer 260, 360, 660 and combined with audio visual information communicated using peer-to-peer connections in the communications layer to create one comprehensive representation of the user as they move throughout and interact with the three-dimensional environment provided through the high-fidelity layer 250, 350, 550.

Referring still to FIG. 3, pictured in the leftmost block, an interface and control layer 280, 380, 880 may be provided to allow the user to control and affect the operation of a session. In some embodiments, the interface and control layer 280, 380, 880 may be displayed to a user on top of the other layers including the communication layer 270, 370, 770, the local layer 260, 360, 660, and the high-fidelity layer 250, 350, 550. In some embodiments, the interface and control layer 280, 380, 880 may be presented as a flat interface at the front portion of the virtualized environment, as if the interface and control layer 280, 380, 880 were part of the screen through which the user is viewing through to engage with the contents provided by the other layers.

Referring now to FIGS. 4-8, an illustrative conferencing session will now be discussed without limitation. Those of skill in the art will appreciate that the selection of environment, assets, participants, and other factors given throughout this example are included for the interest of clarity and to convey the nature of one possible conferencing and/or video content delivery event. Skilled artisans should not view such disclosure as limiting, as such skilled artisans will appreciate additional applications of a system enabled by this disclosure after having the benefit of this disclosure. Such additional applications are intended to be included within the scope and spirit of this disclosure.

Figure 4:
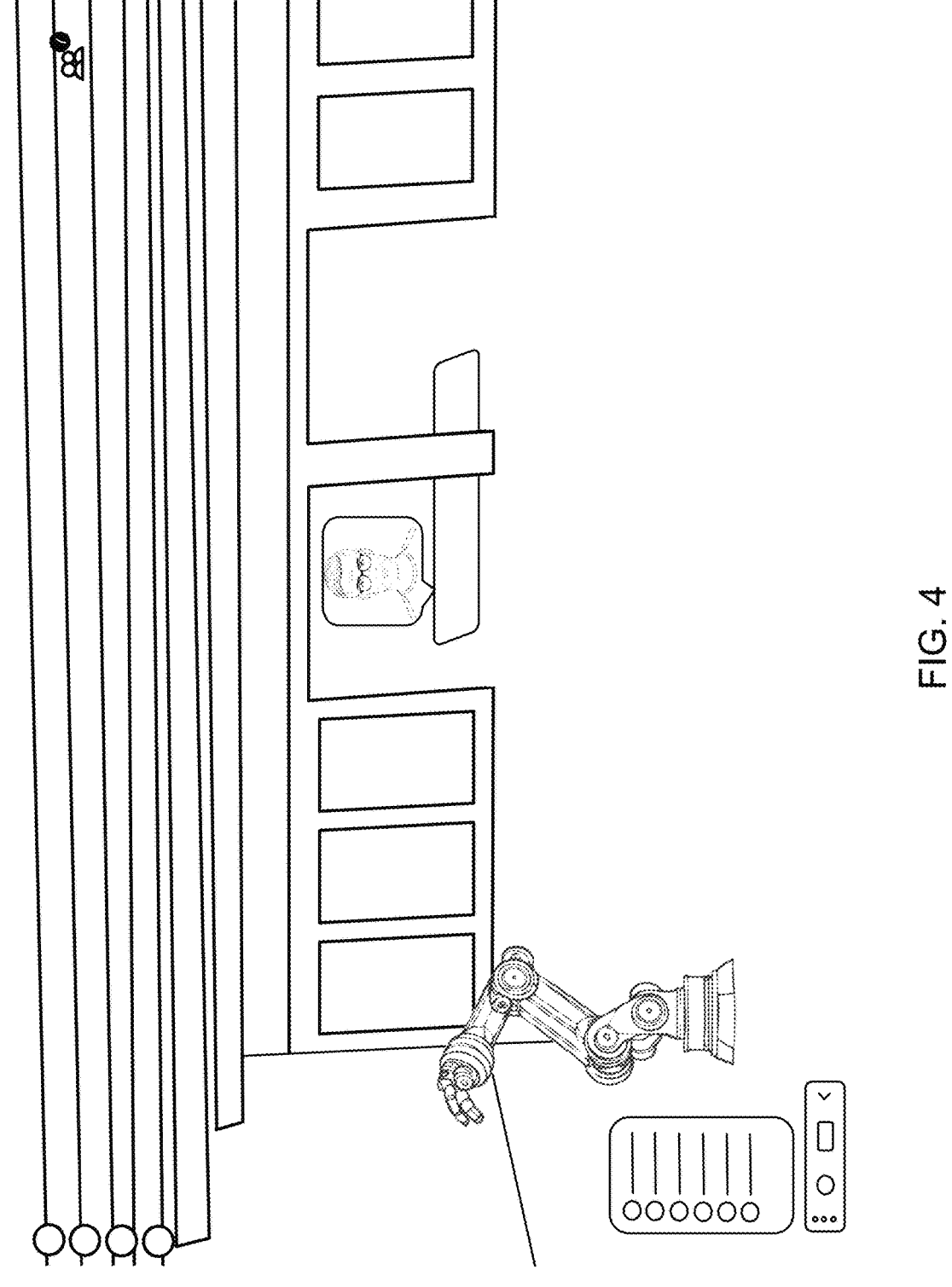
FIG. 4 is a diagram view of an illustrative experience provided by an illustrative conferencing system, according to an embodiment of this disclosure.

The illustrative communication session 400 shown in FIG. 4 includes features of the various layers provided in a conferencing and/or video content delivery platform enabled by this disclosure. Additional FIGS. 5-8 illustrate the contents from other layers that have been combined to create the scene in FIG. 4 as being isolated into each of their respective layers. The various layers shown in this example include the high-fidelity layer 250, 350, 550 (FIGS. 4 and 5), the local layer 260, 360, 660 (FIGS. 4 and 6), the communication layer 270, 370, 770 (FIGS. 4 and 7), and the interface and control layer 280, 380, 880 (FIGS. 4 and 8).

Figure 5:
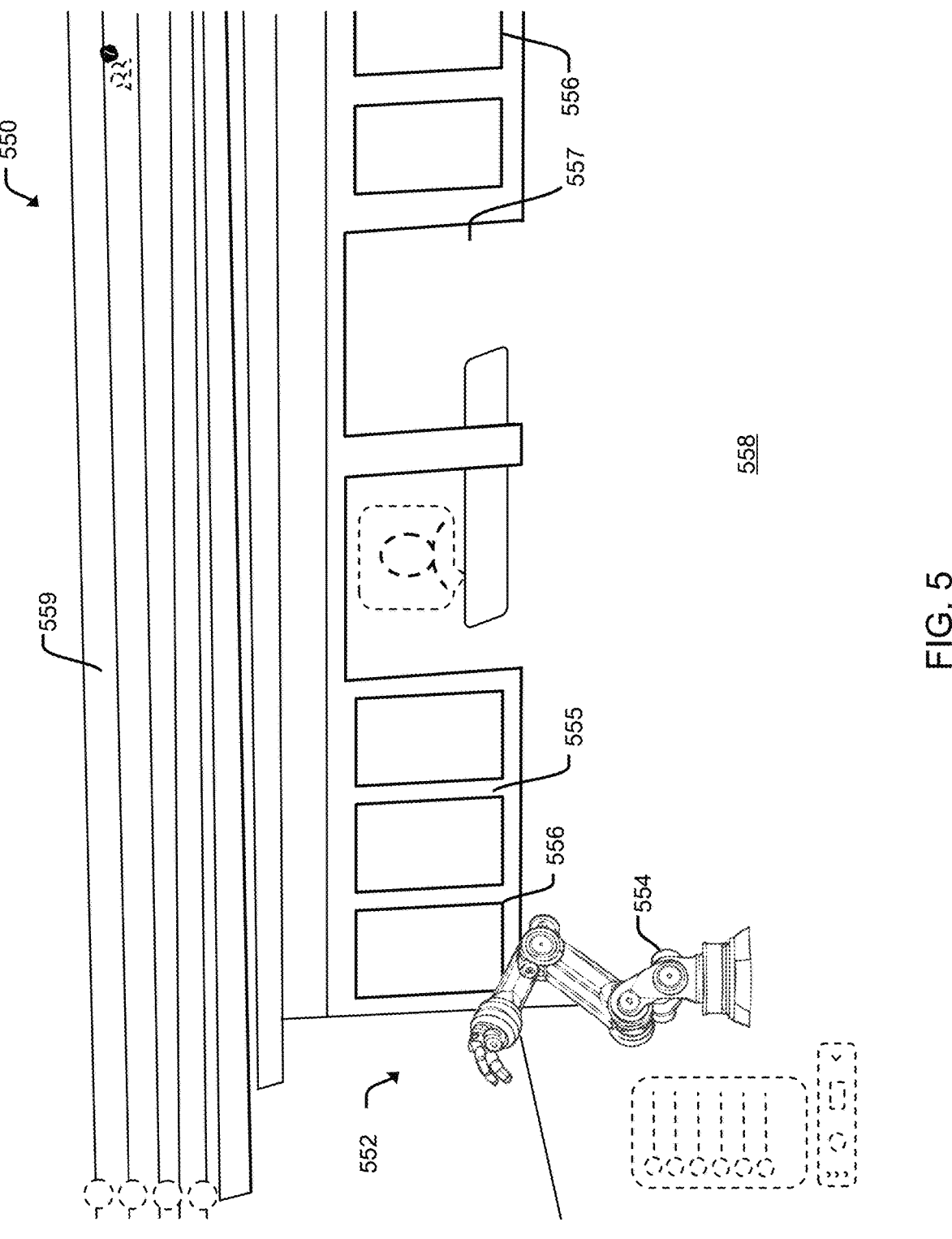
FIG. 5 is a diagram view of an illustrative experience provided by a high-fidelity layer of an illustrative conferencing system.

Referring now to FIGS. 4 and 5, the high-fidelity layer 250, 350, 550 may include the rendered three-dimensional virtualized environment 552, high-fidelity assets 554, elements of a high-fidelity experience, and other content that may require the increased processing provided by a server that renders and streams the high-fidelity layer 250, 350, 550. Shown in FIG. 5, the background contents of the environment, including wall structures 555, windows 556, doorways 557, floors 558, ceilings 559, and other environmental details may be delivered via the high-fidelity layer 250, 350, 550. Also, as represented in FIGS. 4 and 5, placeable high-fidelity assets 554, such as the robotic arm depicted in the figures, may be rendered remotely and delivered via the high-fidelity layer 250, 350, 550. In this example, walls 555, windows 556, and other environmental structures may include information to assist with detecting whether occlusions should occur for other assets of other layers as they interact with the contents delivered through the high-fidelity layer 250, 350, 550.

Figure 6:
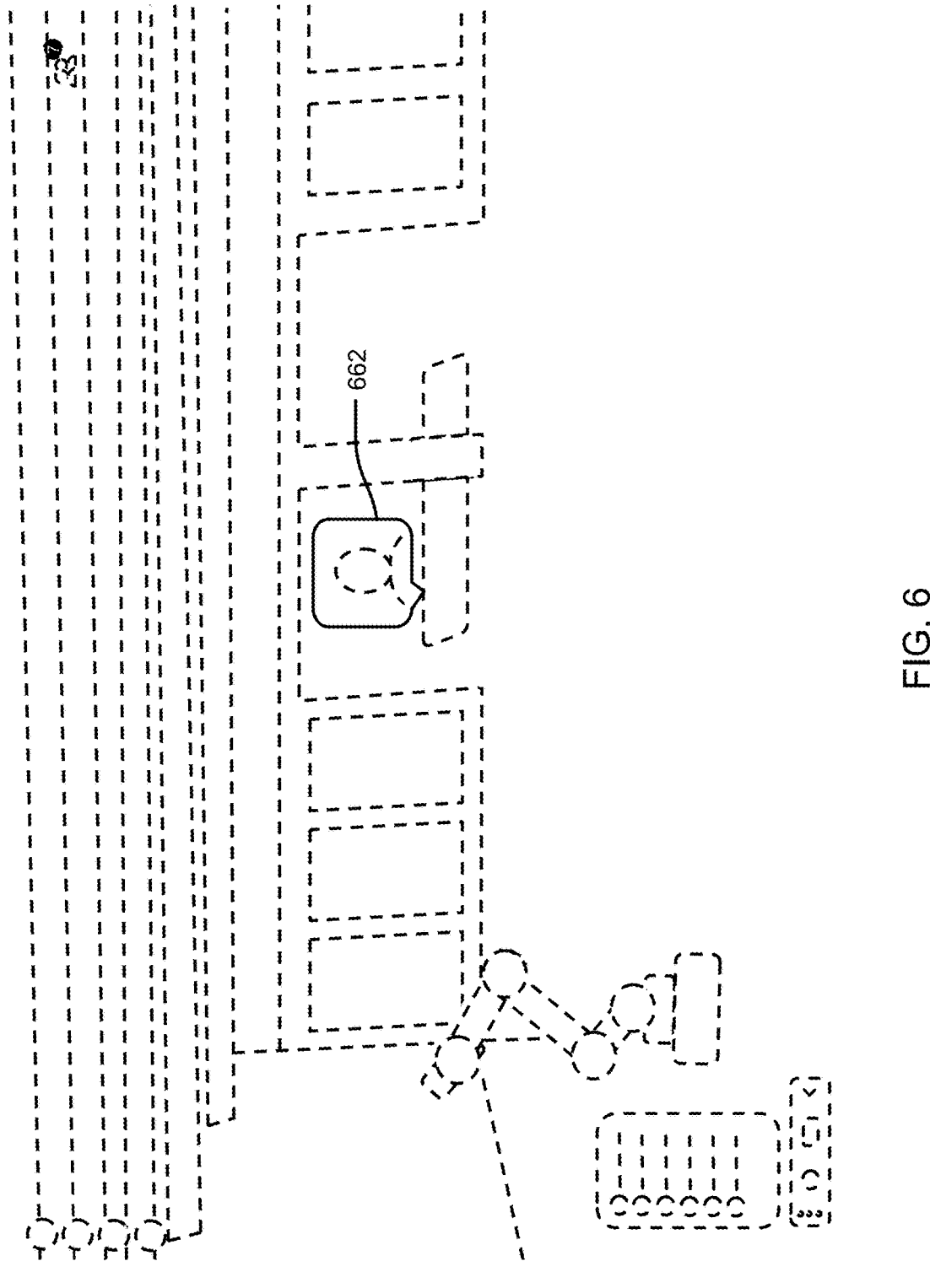
FIG. 6 is a diagram view of an illustrative experience provided by a local layer of an illustrative conferencing system.

Referring now to FIGS. 4 and 6, the local layer 260, 360, 660 may be provided to a user to present an avatar 662, for example a Linkpad, that represents the position of a user within the 3D environment delivered via the high-fidelity layer 250, 350, 550. The avatar 662 may be controlled by the user as they navigate the virtualized environment streamed via the high-fidelity layer 250, 350, 550. Other participants may see the user's avatar 662 move as that user controls their position throughout the virtualized environment.

In a session with multiple participants, each participant may control their perspective and point of view by navigating themselves throughout the virtualized environment, which would be reflected for other users as the moving of an avatar 662 throughout the three-dimensional virtualized environment to reflect that other user's position. The local rendering of the avatar 662 and the remote rendering of the high-fidelity virtual environment may be synchronized such that it is perceived by all users as one cohesive environment that includes corresponding contents of objects and people.

In one embodiment, an instance may be provided to a user to enter and view the environment from an alternative perspective while their avatar 662 remains visible to other users in its original spatial location within the environment. For example, an avatar 662 and alternative perspective camera may be provided, which are not always singular or an exact representation of a user in space. In this example, a user can advantageously be represented in multiple virtual places at once using the same camera feed, but that user having multiple perspectives may actively view the simulated environment through one of the instances related to an alternative perspective.

Figure 7:
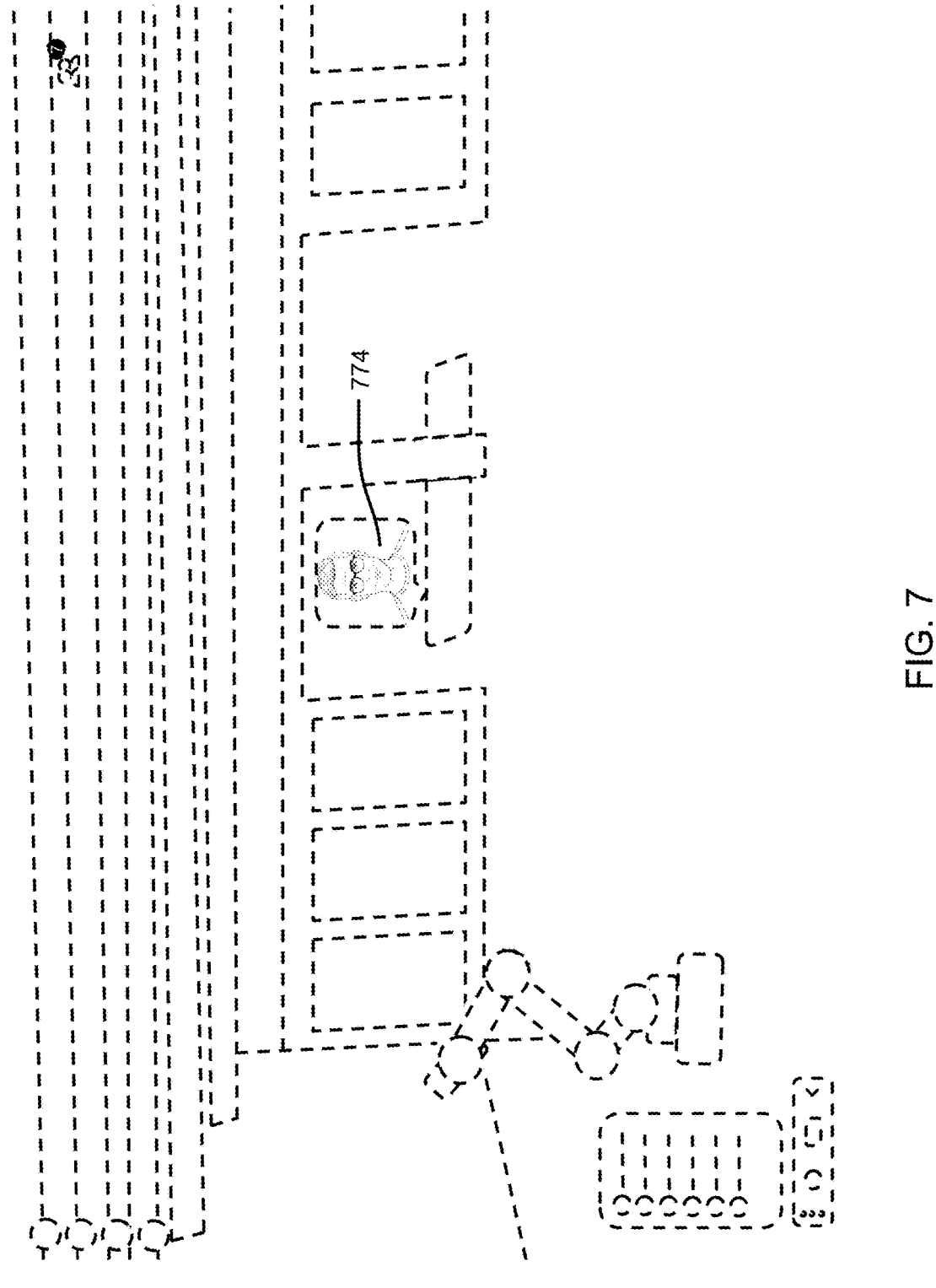
FIG. 7 is a diagram view of an illustrative experience provided by a communications layer of an illustrative conferencing system.
Figure 8:
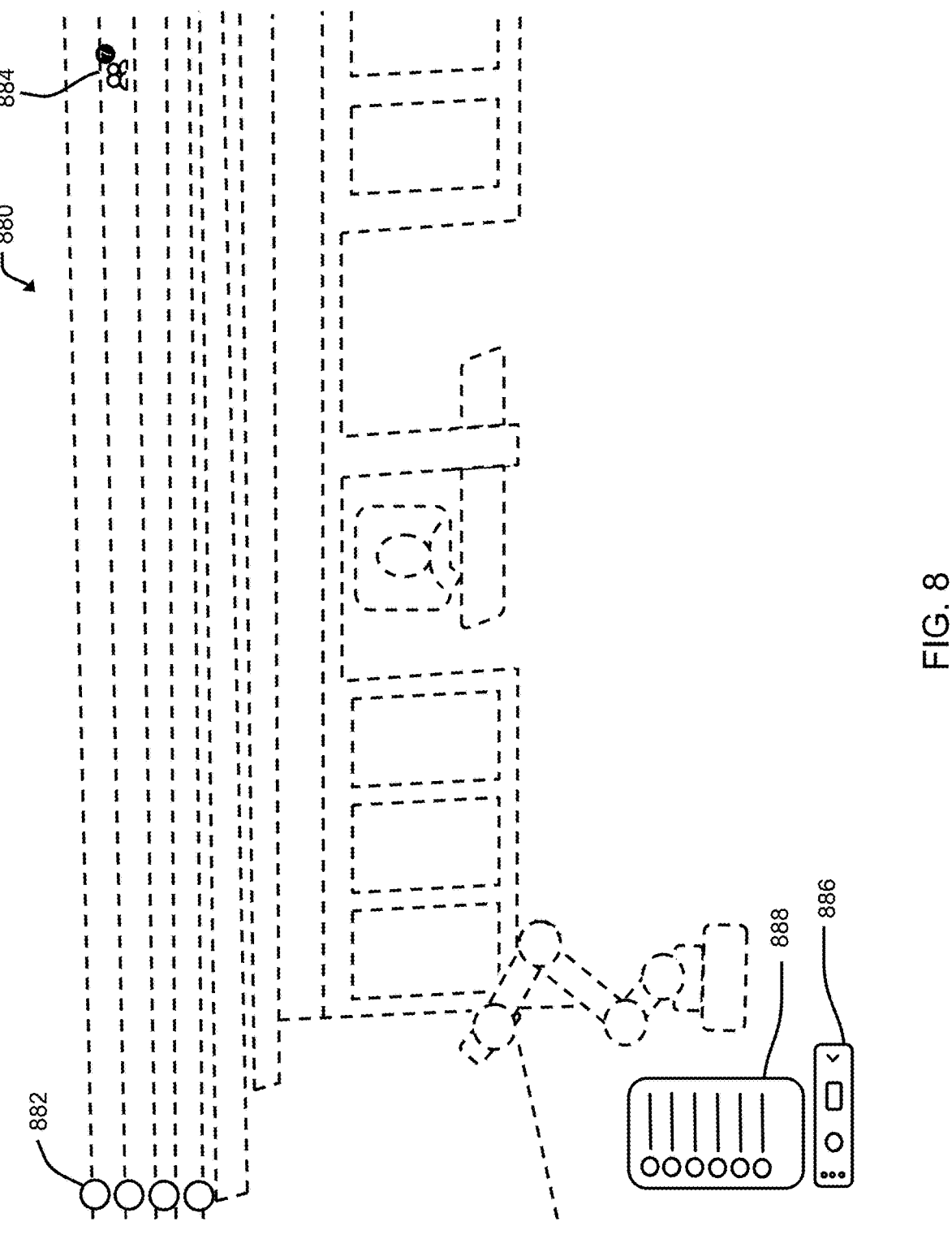
FIG. 8 is a diagram view of an illustrative experience provided by an interface and control layer of an illustrative conferencing system.

Referring now to FIGS. 4 and 7, the communication layer 270, 370, 770 may include audio visual information 774 relating to the conferencing content of a session. For example, the conferencing layer may include audio streams provided by users via their microphone, video content provided by users via their cameras, static images of users that may elect not to present a streamed video, static images of users with network connection issues as a fall back, and other communication features that would be appreciated by a person of skill in the art after having the benefit of this disclosure.

Information communicated through the communication layer 270, 370, 770 may additionally include spatial information, which may assist with incorporating the audio and visual information with the avatar rendered at the local layer 260, 360, 660 to create one virtual comprehensive avatar to be presented to the user. The location information may additionally assist with transforming the video to reflect lighting conditions and other effects relative to the happenings of the high-fidelity layer 250, 350, 550, spatial audio with consideration to the activities of the local layer 260, 360, 660 and the high-fidelity layer 250, 350, 550, and other considerations to enhance the immersion of a user interacting with the communication session enabled by this disclosure.

Referring now to FIGS. 4 and 8, an interface and control layer 280, 380, 880 may be applied to the communication session to allow the user to control aspects of the communication session 882; engage with other users in an alternative forum 884; chat, record, comment, manage attendance 886; and manipulate other features that may be present 888 in a conferencing and/or video content delivery platform such as one enabled by this disclosure. In some embodiments, the interface and control layer 280, 380, 880 may be provided as a flat interface placed in the forefront of a scene presented to a user. For example, the interface may appear as if it sits on the surface of a screen to a user interacting with a session, whereas the remaining layers may be presented as being a three-dimensional environment viewed through the screen by the user.

The contents of each of the layers may be synchronized and combined to create one comprehensive visual product that is delivered to a user. For example, the virtualized environment rendered using high-powered computing equipment may be delivered to the user over a network via the high-fidelity layer 250, 350, 550. The avatar of the users may communicate location data with the high-fidelity layer 250, 350, 550 to render the avatars within the three-dimensional environment of the high-fidelity layer 250, 350, 550. The communication layer 270, 370, 770 may apply a streamed video feed on the face of the avatar, or otherwise associated with the avatar, with audio that is projected from an apparent location of the avatar. The interface and control layer 280, 380, 880 may then be applied as a layer on top of the communications layer, the local layer 260, 360, 660, and the high-fidelity layer 250, 350, 550, to provide users with the tools needed to manage a session.

Figure 9:
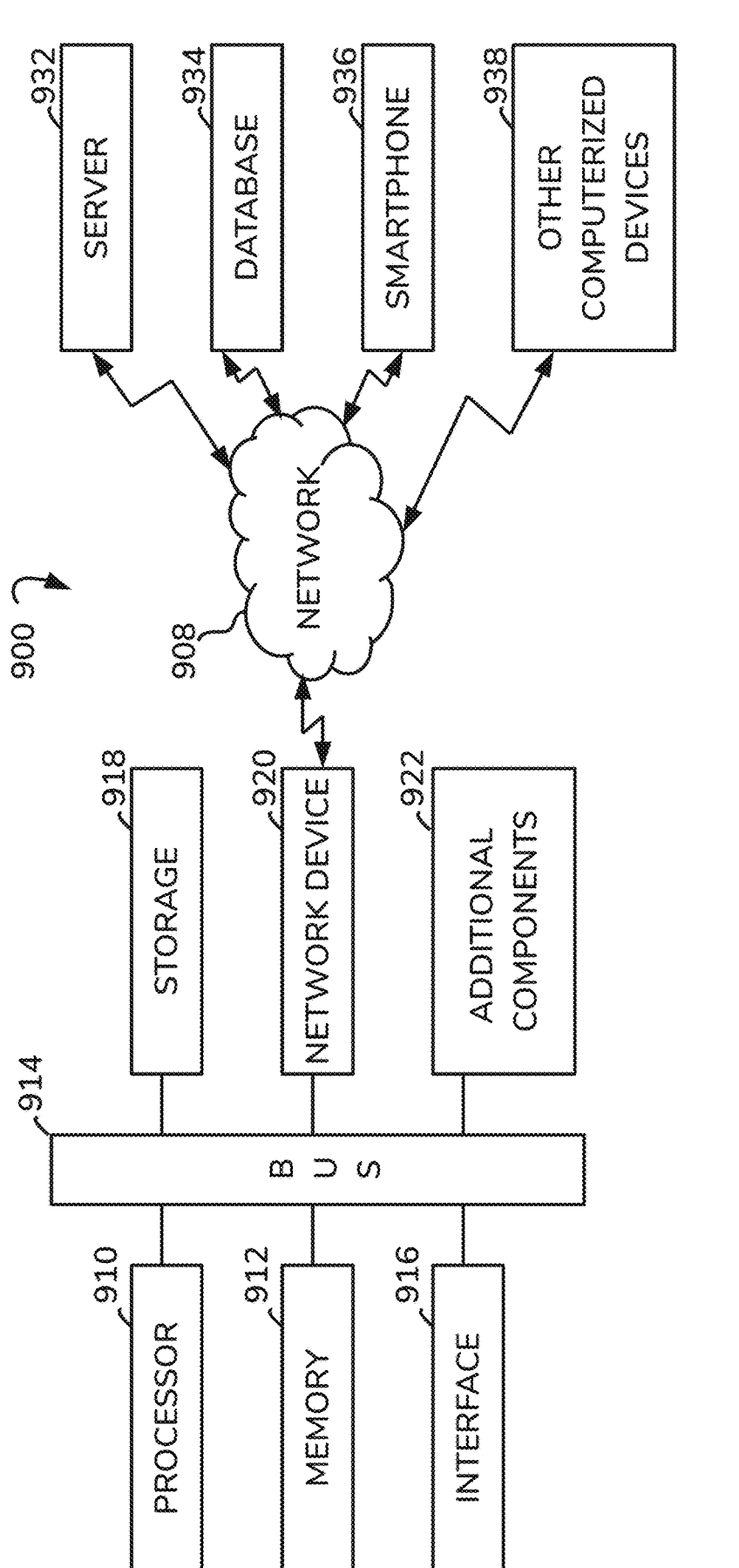
FIG. 9 is a block diagram view of an illustrative computerized device upon which aspects of the disclosure may be operated, according to an embodiment of this disclosure.

Referring now to FIG. 9, an illustrative computerized device will be discussed, without limitation. Various aspects and functions described in accord with the present disclosure may be implemented as hardware or software on one or more illustrative computerized devices 900 or other computerized devices. There are many examples of illustrative computerized devices 900 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 900 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 900, among others. Additionally, aspects in accord with the present disclosure may be located on a single illustrative computerized device 900 or may be distributed among one or more illustrative computerized devices 900 connected to one or more communication networks.

For example, various aspects and functions may be distributed among one or more illustrative computerized devices 900 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 9 shows a block diagram of an illustrative computerized device 900, in which various aspects and functions in accord with the present disclosure may be practiced. The illustrative computerized device 900 may include one or more illustrative computerized devices 900. The illustrative computerized devices 900 included by the illustrative computerized device may be interconnected by, and may exchange data through, a communication network 908. Data may be communicated via the illustrative computerized device using a wireless and/or wired network connection.

Network 908 may include any communication network through which illustrative computerized devices 900 may exchange data. To exchange data via network 908, systems and/or components of the illustrative computerized device 900 and the network 908 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 900 may transmit data via the network 908 using a variety of security measures including TSL, SSL, or VPN, among other security techniques. The illustrative computerized device 900 may include any number of illustrative computerized devices 900 and/or components, which may be networked using virtually any medium and communication protocol or combination of protocols.

Various aspects and functions in accord with the present disclosure may be implemented as specialized hardware or software executing in one or more illustrative computerized devices 900, including a illustrative computerized device 900 shown in FIG. 9. As depicted, the illustrative computerized device 900 may include a processor 910, memory 912, a bus 914 or other internal communication system, an input/output (I/O) interface 916, a storage system 918, and/or a network communication device 920. Additional devices 922 may be selectively connected to the computerized device via the bus 914. Processor 910, which may include one or more microprocessors or other types of controllers, can perform a series of instructions that result in manipulated data. Processor 910 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 910 may be connected to other system elements, including a memory 912, by bus 914.

The illustrative computerized device 900 may also include a network communication device 920. The network communication device 920 may receive data from other components of the computerized device to be communicated with servers 932, databases 934, smart phones 936, and/or other computerized devices 938 via a network 908. The communication of data may optionally be performed wirelessly. More specifically, without limitation, the network communication device 920 may communicate and relay information from one or more components of the illustrative computerized device 900, or other devices and/or components connected to the computerized device 900, to additional connected devices 932, 934, 936, and/or 938. Connected devices are intended to include, without limitation, data servers, additional computerized devices, mobile computing devices, smart phones, tablet computers, and other electronic devices that may communicate digitally with another device. In one example, the illustrative computerized device 900 may be used as a server to analyze and communicate data between connected devices.

The illustrative computerized device 900 may communicate with one or more connected devices via a communications network 908. The computerized device 900 may communicate over the network 908 by using its network communication device 920. More specifically, the network communication device 920 of the computerized device 900 may communicate with the network communication devices or network controllers of the connected devices. The network 908 may be, for example, the internet. As another example, the network 908 may be a WLAN. However, skilled artisans will appreciate additional networks to be included within the scope of this disclosure, such as intranets, local area networks, wide area networks, peer-to-peer networks, and various other network formats. Additionally, the illustrative computerized device 900 and/or connected devices 932, 934, 936, and/or 938 may communicate over the network 908 via a wired, wireless, or other connection, without limitation.

Memory 912 may be used for storing programs and/or data during operation of the illustrative computerized device 900. Thus, memory 912 may be a relatively high performance, volatile, random access memory such as a dynamic random access memory (DRAM) or static memory (SRAM). However, memory 912 may include any device for storing data, such as a disk drive or other non-volatile storage device. Various embodiments in accord with the present disclosure can organize memory 912 into particularized and, in some cases, unique structures to perform the aspects and functions of this disclosure.

Components of illustrative computerized device 900 may be coupled by an interconnection element such as bus 914. Bus 914 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI and Infini-Band. Thus, bus 914 may enable communications (for example, data and instructions) to be exchanged between system components of the illustrative computerized device 900.

The illustrative computerized device 900 also may include one or more interface devices 916 such as input devices, output devices and combination input/output devices. Interface devices 916 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 916 allow the illustrative computerized device 900 to exchange information and communicate with external entities, such as users and other systems.

Storage system 918 may include a computer readable and writeable nonvolatile storage medium in which instructions can be stored that define a program to be executed by the processor. Storage system 918 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk or flash memory, among others. In operation, processor 910 or some other controller may cause data to be read from the nonvolatile recording medium into another memory, such as the memory 912, that allows for faster access to the information by the processor than does the storage medium included in the storage system 918. The memory may be located in storage system 918 or in memory 912. Processor 910 may manipulate the data within memory 912, and then copy the data to the medium associated with the storage system 918 after processing is completed. A variety of components may manage data movement between the medium and integrated circuit memory element and does not limit the disclosure. Further, the disclosure is not limited to a particular memory system or storage system.

Although the above described illustrative computerized device is shown by way of example as one type of illustrative computerized device upon which various aspects and functions in accord with the present disclosure may be practiced, aspects of the disclosure are not limited to being implemented on the illustrative computerized device 900 as shown in FIG. 9. Various aspects and functions in accord with the present disclosure may be practiced on one or more computers having components other than that shown in FIG. 9. For instance, the illustrative computerized device 900 may include specially-programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 900 may include an operating system that manages at least a portion of the hardware elements included in illustrative computerized device 900. A processor or controller, such as processor 910, may execute an operating system which may be, among others, an operating system, one of the above mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together to define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-pro-grammed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, WA, Oracle Database or MySQL from Oracle of Austin, TX, or integration software such as WebSphere middleware from IBM of Armonk, NY.

In operation, a method may be provided for virtualizing an environment to provide improved communication and conferencing between participants. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 10:
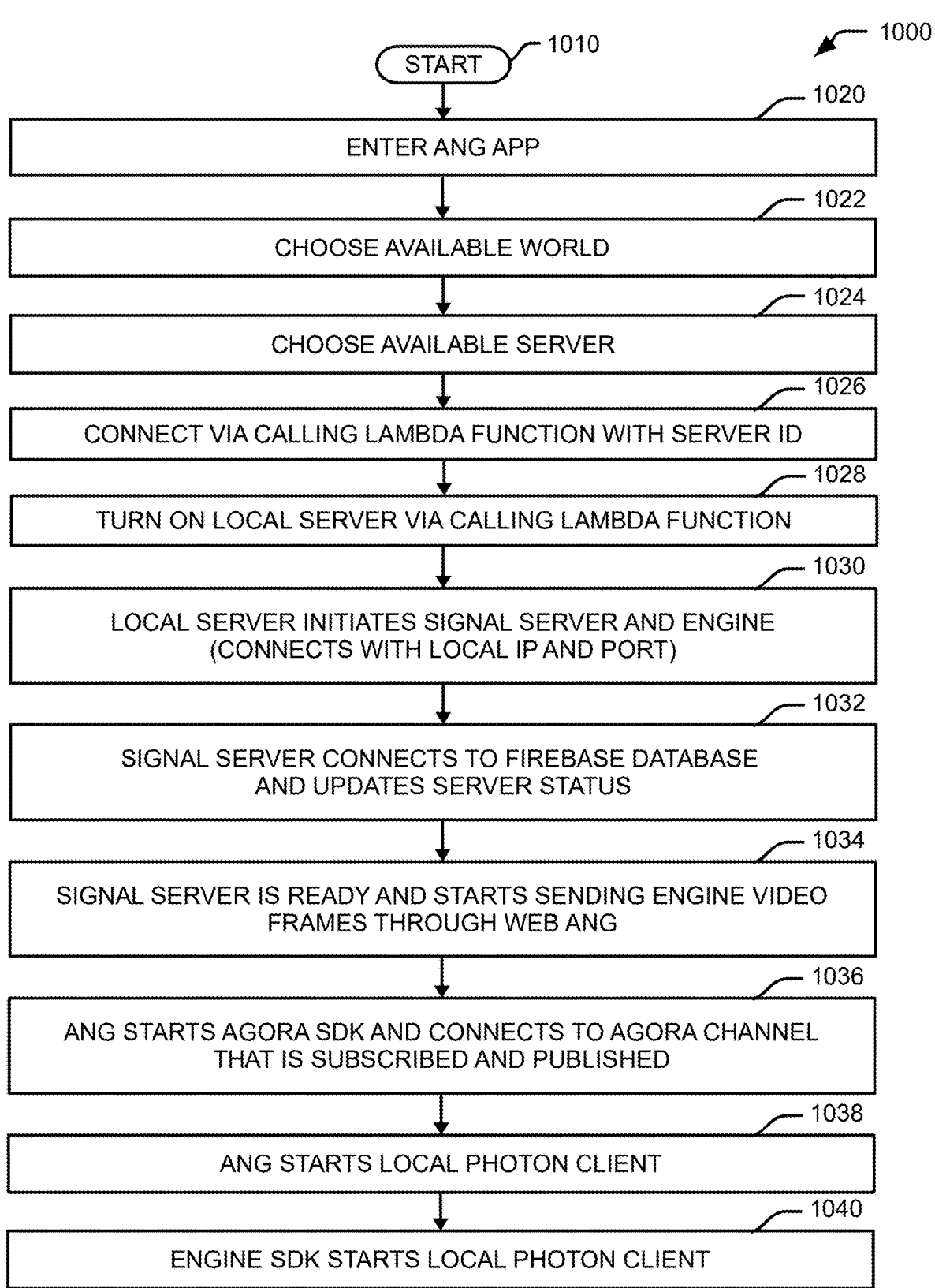
FIG. 10 is a flow chart view of an illustrative user experience, according to an embodiment of this disclosure.

Referring now to the flowchart 1000 of FIG. 10, an example method for an illustrative user experience will be described, without limitation. Starting at Block 1010, an operation may begin with a user entering a conferencing and/or video content delivery platform enabled by this disclosure (Block 1020). In some examples, accessing the platform may include providing account credentials, setting meeting preferences, selecting desired participants, and otherwise organizing the platform to prepare to join a conferencing session.

The operation may then proceed to the steps of choosing an available world and/or another environment (Block 1022). For example, the user may choose a stock world, desired environmental location, custom location, photo-grammetry-derived world, or other environment that may be virtualized on the high-fidelity layer. In some embodiments, the user may additionally select a server to render the selected world or environment for the high-fidelity layer (Block 1024). In some embodiments, server selection may be at least partially automated.

The operation may then proceed to call a database that includes assets that may be used to draw the interface and hosting environment (Block 1026). For example, calls may be made to a Lambda function with a desired server ID to engage the server resources. The operation may then make a call to one or more databases that include assets that may be used to draw aspects of the local layer (Block 1028). For example, calls may be made to a Lambda function to enable a local server to access processing resources.

The operation may then proceed with the local server initiating a signaling server and rendering engine (Block 1030). In this step, the local server, signaling server, and rendering engine located at the remote server may be associated with one another, for example, via specifying communication addresses and corresponding ports. For example, the various processing resources may connect to one another via an IP address managed by the local server through one or more specified port numbers.

The operation may then proceed with the signaling server connecting to a database to manage updates to server status (Block 1032). In one example, provided without limitation, the connected database may be a cloud-hosted NoSQL database that allows storage and synchronization of data between users in real-time. In one embodiment, a Firebase database may be used in this step. This step may additionally include hosting an Angular application, which may monitor the database connected to the signaling server for updates.

The operation may then proceed to the signaling server entering a ready state, in which it may begin sending a pixel stream from the rendering engine operating on the remote server (Block 1034). In one embodiment, the pixel stream may be provided through a protocol such as WebRTC and/or a client-side application framework such as Angular.

The operation may then proceed with the client-side application framework starting a communication SDK and connecting to a corresponding communication channel (Block 1036). In one embodiment, the communication channel may be provided via features included by Agora, without limitation. In some embodiments, the communication SDK may assign a communication channel for each session. Multiple users may be designated to a communication channel. Address and parameter details for one or more communication channels may be shared with other servers and operations, which may be subscribed to, published, and otherwise distributed as will be appreciated by a person of skill in the art.

The operation may then proceed with the client-side application framework initiating a network messaging framework. In one embodiment, without limitation, the network messaging framework may be provided via Photon (Block 1038). The rendering engine designated to create content for the high-fidelity layer may be additionally connected to the network messaging framework, though which the rendering engine may receive alerts, messaging, updates, and other data relating to actions that occur during a session. As participants join a session, the communication SDK, network messaging framework, and/or additional aspects may communicate the change in state of the communication session to other connected platforms such as the rendering engine.

The operation may then establish a conferencing session, with the initialization steps concluding. In some embodiments, the operation may continue to monitor the status of the communication session and adjust connections, parameters, and resources as requested throughout administration of the conferencing session (Block 1040).

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A system comprising a non-transitory computer readable storage medium wherein at least one instruction is stored in the medium, and the at least one instruction is loaded and executed by a processor to provide a three-dimensional layered conferencing system with distributed computing for high-fidelity rendering of a virtual environment comprising:

a high-fidelity layer rendered remotely on a server and streamed to a user device in approximately real-time over a network without intended delay comprising the virtual environment in high fidelity for a communication session;

a local layer rendered locally on the user device, which is separate and distinct from rendering of the virtual environment by the server, comprising an avatar for a user to be integrated into the virtual environment for the communication session, the local layer being synchronized with high-fidelity layer that is independently rendered on a server and streamed to the user device over the network;

a communication layer operated over a decentralized peer-to-peer network comprising audiovisual content of the user communicated in approximately real-time without intended delay for the communication session; and an interface and control layer for providing interactive controls for managing at least interaction with the virtual environment and the audiovisual content during the communication session;

wherein at least part of the audiovisual content of the communication layer is associated with the avatar of the local layer;

wherein the at least the avatar and the audiovisual content is spatially associated with a position within the virtual environment via metadata;

wherein the server renders the virtual environment using dynamic level of detail (LoD) techniques to conserve computational resources;

wherein synchronization between the high-fidelity layer and the local layer are managed using timestamping to make corrective adjustments when discrepancies between the local layer and the high-fidelity layer are detected; and wherein a microphone or camera that is locally connected to the user device is controlled via the interactive controls.

2. The system of claim 1:

wherein the virtual environment is rendered by the server in three dimensions; and wherein the avatar and the audiovisual content are positioned together and move about together in the three dimensions within the virtual environment.

3. The system of claim 2, wherein navigational meshes are used with the virtual environment to define an accessible area for the avatar that represents the user within the three dimensions.

4. The system of claim 1, further comprising:

a signaling server to initiate the communication session, negotiate parameters of the communication session, and relay control messages between the users of the communication session.

5. The system of claim 1, wherein predictive rendering is used to improve responsiveness of the communication session by anticipating future actions of the user and pre-rendering frames of a viewable portion of the virtual environment.

6. The system of claim 5, wherein anticipating the future actions comprises:

(a) monitoring inputs by the user to predict likely next movements within the virtual environment;

(b) predicting a future viewpoint of the user within the virtual environment;

(c) pre-rendering the frames that correspond to the future viewpoints and storing the frames that are pre-rendered in a buffer;

(d) if a current viewpoint significantly matches the future viewpoint, selecting the frames that were pre-rendered that best matches the current viewpoint and displaying the frames from the future viewpoint to the user as the current viewpoint; and (e) if the current viewpoint deviates significantly from the future viewpoint, falling back to on-demand rendering of the current viewpoint in approximately real-time without intended delay.

7. The system of claim 1, wherein the interactive controls are rendered by the user device.

8. The system of claim 1:

wherein the interactive controls are rendered by the server and communicated to the user device via a second channel of the high-fidelity layer; and wherein the virtual environment is additionally communicated to the user device via a first channel of the high-fidelity layer.

9. A non-transitory computer readable storage medium wherein at least one instruction is stored in the medium, and the at least one instruction is loaded and executed by a processor to provide a three-dimensional layered conferencing system with distributed computing for high-fidelity rendering of a virtual environment comprising:

a high-fidelity layer rendered remotely on a server and streamed to a user device in approximately real-time over a network without intended delay comprising the virtual environment in three dimensions and in high fidelity for a communication session;

a local layer rendered locally on the user device, which is separate and distinct from rendering of the virtual environment by the server, comprising an avatar for a user to be integrated into the virtual environment for the communication session, the local layer being synchronized with high-fidelity layer that is independently rendered on a server and streamed to the user device over the network;

a communication layer operated over a decentralized peer-to-peer network comprising audiovisual content of the user communicated in approximately real-time without intended delay for the communication session;

an interface and control layer for providing interactive controls for managing at least interaction with the virtual environment and the audiovisual content during the communication session; and a signaling server to initiate the communication session, negotiate parameters of the communication session, and relay control messages between the users of the communication session;

wherein at least part of the audiovisual content of the communication layer is associated with the avatar of the local layer;

wherein the at least the avatar and the audiovisual content is spatially associated with a position in the three dimensions within the virtual environment via metadata; and wherein the server renders the virtual environment using dynamic level of detail (LoD) techniques to conserve computational resources;

wherein synchronization between the high-fidelity layer and the local layer are managed using timestamping to make corrective adjustments when discrepancies between the local layer and the high-fidelity layer are detected;

wherein the signaling server further monitors quality of the communication session, provides feedback regarding the communication session to the users, and manages session resources relating to the communication session.

10. The non-transitory computer readable storage medium of claim 9, wherein a microphone or camera that is locally connected to the user device is controlled via the interactive controls.

11. The non-transitory computer readable storage medium of claim 9, wherein navigational meshes are used with the virtual environment to define an accessible area for the avatar that represents the user within the three dimensions.

12. The non-transitory computer readable storage medium of claim 9:

wherein predictive rendering is used to improve responsiveness of the communication session by anticipating future actions of the user and pre-rendering frames of a viewable portion of the virtual environment; and wherein anticipating the future actions comprises:

(a) monitoring inputs by the user to predict likely next movements within the virtual environment;

(b) predicting a future viewpoint of the user within the virtual environment;

(c) pre-rendering the frames that correspond to the future viewpoints and storing the frames that are pre-rendered in a buffer;

(d) if a current viewpoint significantly matches the future viewpoint, selecting the frames that were pre-rendered that best matches the current viewpoint and displaying the frames from the future viewpoint to the user as the current viewpoint; and (e) if the current viewpoint deviates significantly from the future viewpoint, falling back to on-demand rendering of the current viewpoint in approximately real-time without intended delay.

13. A method of providing a three-dimensional layered conferencing system with distributed computing for high-fidelity rendering of a virtual environment, the method being performed on a computerized device comprising a processor and memory with instructions being stored in the memory and operated from the memory to transform data, the method comprising:

a) initiating a communication session via a signaling server;

b) rendering remotely on a server a high-fidelity layer comprising the virtual environment in three dimensions;

c) streaming the high-fidelity layer to a user device in approximately real-time over a network without intended delay for the communication session;

d) rendering locally on the user device a local layer comprising an avatar for a user, which is separate and distinct from rendering of the virtual environment by the server, to be integrated into the virtual environment for the communication session, the local layer being synchronized with high-fidelity layer that is independently rendered on a server and streamed to the user device over the network;

e) coordinating over a decentralized peer-to-peer network a communication layer comprising audiovisual content of the user communicated in approximately real-time without intended delay for the communication session; and f) providing interactive controls via an interface and control layer for managing at least interaction with the virtual environment and the audiovisual content during the communication session;

wherein at least part of the audiovisual content of the communication layer is associated with the avatar of the local layer;

wherein the at least the avatar and the audiovisual content is spatially associated with a position within the virtual environment in the three dimensions; and wherein the server renders the virtual environment using dynamic level of detail (LoD) techniques to conserve computational resources;

wherein synchronization between the high-fidelity layer and the local layer are managed using timestamping to make corrective adjustments when discrepancies between the local layer and the high-fidelity layer are detected;

wherein the signaling server additionally negotiates parameters of the communication session and relays control messages between the users of the communication session.

14. The method of claim 13, wherein predictive rendering is used to improve responsiveness of the communication session by anticipating future actions of the user and pre-rendering frames of a viewable portion of the virtual environment.

15. The method of claim 14, wherein anticipating the future actions comprises:

(i) monitoring inputs by the user to predict likely next movements within the virtual environment;

(ii) predicting a future viewpoint of the user within the virtual environment;

(iii) pre-rendering the frames that correspond to the future viewpoints and storing the frames that are pre-rendered in a buffer;

(iv) if a current viewpoint significantly matches the future viewpoint, selecting the frames that were pre-rendered that best matches the current viewpoint and displaying the frames from the future viewpoint to the user as the current viewpoint; and (v) if the current viewpoint deviates significantly from the future viewpoint, falling back to on-demand rendering of the current viewpoint in approximately real-time without intended delay.

16. The method of claim 13, wherein the interactive controls are rendered by the server and communicated to the user device via a second channel of the high-fidelity layer; and wherein the virtual environment is additionally communicated to the user device via a first channel of the high-fidelity layer.

17. The system of claim 1, further comprising:

a first database provided as a fully managed relational database;

a second database to store contents, models, assets, and art; and a third database to store backend data.

18. The system of claim 17, wherein the backend data is at least partially provided by Node.js.

19. The system of claim 1, further comprising:

a fallback mechanism to continuously monitor quality and stability of the network and, upon detection of exceeding a threshold of instability or packet loss, perform local rendering of the virtual environment until the threshold of instability or packet loss is no longer exceeded.

20. The system of claim 19, wherein the local rendering comprises processing requirement mitigation techniques comprising use of a local cache, reduced render fidelity, hybrid rendering solutions, bilateral adjustments to the bitrate of a pixel-streaming feed, and seamless reintegration of the pixel-streamed high-fidelity environment upon determination that the threshold of instability or packet loss is no longer exceeded.

* * * * *